United States Patent
Miyashita et al.

(10) Patent No.: US 7,266,772 B2
(45) Date of Patent: Sep. 4, 2007

(54) PROJECTOR CONNECTED TO A NETWORK, A DISPLAY SYSTEM, AND A METHOD FOR DISPLAYING IMAGES AND/OR IMAGE DATA VIA A PROJECTOR CONNECTED TO A NETWORK

(75) Inventors: Kiyoshi Miyashita, Ina (JP); Miki Nagano, Shiojiri (JP); Masaru Kono, Shiojin (JP); Shoichi Akaiwa, Hatsumoto (JP); Kazuyosi Nakamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 694 days.

(21) Appl. No.: 10/031,744

(22) PCT Filed: May 31, 2001

(86) PCT No.: PCT/JP01/04628

§ 371 (c)(1),
(2), (4) Date: Jan. 25, 2002

(87) PCT Pub. No.: WO01/93583

PCT Pub. Date: Jun. 12, 2001

(65) Prior Publication Data

US 2002/0122158 A1   Sep. 5, 2002

(30) Foreign Application Priority Data

May 31, 2000 (JP) ............................. 2000-161859
Jul. 31, 2000 (JP) ............................. 2000-230905

(51) Int. Cl.
*G06F 3/00* (2006.01)
*G06F 9/00* (2006.01)
*G06F 17/00* (2006.01)

(52) U.S. Cl. ...................... 715/730; 715/744; 353/122; 345/1.1

(58) Field of Classification Search ................ 715/744, 715/730; 353/122; 345/1.1
See application file for complete search history.

(56) References Cited

U.S. PATENT DOCUMENTS 5,658,063 A  *  8/1997  Nasserbakht ................ 353/122

(Continued)

FOREIGN PATENT DOCUMENTS

EP   0 838 768 A2   4/1998

(Continued)

OTHER PUBLICATIONS

Sampath-Kumar et al. "WebPresent—A World Wide Web based tele-presentation tool for physicians." *SPIE* vol. (3031): 490-499. (Feb. 1997).

*Primary Examiner*—Kristine Kincaid
*Assistant Examiner*—Boris Pesin
(74) *Attorney, Agent, or Firm*—Oliff & Berridge, PLC

(57) ABSTRACT

Commands and data transferred via a network line NL are input to an ASP terminal portion 20 via a network interface controller 220. A first CPU loads a client application corresponding to the command and generated user interface image data via a graphics controller 210. A video signal conversion circuit 310 receives image data from the graphics controller 210 and transfers the processed image data to an LCD drive circuit 330. LCD drive circuit 330 drives an LCD 332 in response to the received image data to project the desired image data onto a projection screen.

26 Claims, 17 Drawing Sheets

U.S. PATENT DOCUMENTS

| | | |
|---|---|---|
| 5,668,566 A | 9/1997 | Yen |
| 5,924,013 A | 7/1999 | Guido et al. |
| 5,956,487 A | 9/1999 | Venkatraman et al. |
| 6,005,534 A * | 12/1999 | Hylin et al. .................. 345/2.1 |
| 6,170,007 B1 | 1/2001 | Venkatraman et al. |
| 6,489,934 B1 * | 12/2002 | Klausner .................... 345/1.1 |
| 6,615,239 B1 * | 9/2003 | Berstis ....................... 709/204 |
| 6,760,045 B1 * | 7/2004 | Quinn et al. ................ 715/744 |
| 6,785,814 B1 * | 8/2004 | Usami et al. ............... 713/176 |
| 6,920,502 B2 * | 7/2005 | Araujo et al. ............... 709/229 |

FOREIGN PATENT DOCUMENTS

| | | | |
|---|---|---|---|
| JP | A 5-173490 | | 7/1993 |
| JP | A 5-181770 | | 7/1993 |
| JP | A 5-249931 | | 9/1993 |
| JP | A 7-264527 | | 10/1995 |
| JP | A 8-265579 | | 10/1996 |
| JP | A 9-244828 | | 9/1997 |
| JP | A 10-336375 | | 12/1998 |
| JP | A 11-75145 | | 3/1999 |
| JP | 2000023148 | * | 1/2000 |
| JP | A 2000-23148 | | 1/2000 |
| JP | A 2000-23149 | | 1/2000 |
| JP | A 2000-23150 | | 1/2000 |

* cited by examiner

```
<HTML>
  <HEAD>
  <TITLE> INKING IMAGE YEAR/MONTH/DAY </TITLE>  </HEAD>
    <BODY>
      <IMG SRC="0004201200">  <! CHRONOLOGICAL ORDER>
      <IMG SRC="0004201201">

</BODY>
<HTML>
```

*Fig. 15*

PROJECTOR CONNECTED TO A NETWORK, A DISPLAY SYSTEM, AND A METHOD FOR DISPLAYING IMAGES AND/OR IMAGE DATA VIA A PROJECTOR CONNECTED TO A NETWORK

TECHNICAL FIELD

The present invention relates to a projection type display device (projector) connectable to a network, and to a method for displaying images over a network.

BACKGROUND OF THE INVENTION

Projection type display devices (projectors) to date are typically connected via a video cable to an image generating device, for example, a video cassette recorder or computer. A computer-generated analog RGB signal is input to the projector via a video cable and rendered as an image on a screen or the like. However, conventional projectors function as simple stand-alone projectors.

With expansion of networks in recent years, there have been developed technologies for shifting the bulk of processing to server computers in order to reduce the load on client computers. In application service provider (ASP) technologies, for example, an application program (hereinafter "application") requested is run on the server computer, and the results are transmitted to the client as HTML data or as display screen data in a proprietary format. With ASP technology, the client merely runs a client application and displays on its display a user interface (display screen information) in response to the received display screen data. Thus, relatively few functions are required of a client, allowing it to function as a so-called "thin client."

Another development seen in recent years has been the increasing use of projectors for presentations at conferences and the like. Permanent projector installations in individual conference rooms are no longer rare.

This state of affairs has led to a desire to connect projectors to networks. However, to date projectors have been designed on the assumption that they will be connected to a local computer, and thus network hookups have required the agency of a computer. This requires providing one computer for each projector one wishes to connect to the network, posing a problem of inefficiency. Further, the computer and projector must be connected by a cable each time they are used, which obviates the convenience associated with networks. Another problem is that larger numbers of computers require more management resources. Also, additional convenience could be provided if projectors could function as terminal devices at ASPs.

DISCLOSURE OF THE INVENTION

With the foregoing in view, it is an object of the present invention to provide a projector that can be connected to a network without through a computer. It is a further object to provide a projector capable of functioning as a client of a server computer. It is yet another object to provide a projector capable of functioning as an ASP terminal device at an ASP.

In a first aspect, the invention achieves the stated object by providing a projector that can be connected to a network. The projector according to this first aspect of the invention comprises a network connection portion for sending and receiving data over a network; an image data generating portion for generating image data for display, based on data received via said network connection portion; and a projection display portion for projecting said generated image data.

The projector according to this first aspect can be connected independently to a network, without being connected to a computer. The projector according to this first aspect can function as a client of a server computer.

In the projector according to this first aspect, data received by the image data generating portion can be screen data, and the image data generating portion can execute a client application to generate image data on the basis of this screen data. With such an arrangement, the projector can function as an ASP terminal device at an ASP.

In the projector according to this first aspect, it also possible for the image data generating portion to execute a viewer application to generate image data on the basis of received data. Alternatively, the image data generating portion may identify the data format of received data and execute a suitable viewer application for the identified data format in order to generate image data. In this case, the received application data can be opened by the viewer application or application and displayed on the display screen (user interface) of the application.

The projector according to this first aspect may further comprise a playback audio data generating portion for generating audio data for playback on the basis of data received via the network connection portion, and an audio data playback portion for outputting the playback audio data so generated. It is also possible for data to consist of multimedia data that includes motion video data and audio data associated with the motion video data; for the image data generating portion generated image data to be displayed on the basis of motion video data received via the network connection portion; and for the audio data playback portion to generate playback audio data associated with the generated image data, on the basis of audio data associated with the motion video data received via the network connection portion.

By providing the above arrangement, it is further possible to project not only graphics, but also audio or still video or motion video associated with audio.

The projector pertaining to this first aspect may further comprise an external input signal receiving portion for receiving an external input signal from an external input portion. The projector pertaining to this first aspect may further comprise an identifier for uniquely identifying itself from other projectors, and the external input portion may comprise an identifier selecting portion for selecting said identifier, thereby enabling unique input to one desired projector from among a plurality of projectors. By providing this arrangement, a plurality of projectors can be controlled by a single external input portion. That is, data, commands, etc. can be input individually to individual projectors.

In the projector pertaining to this first aspect the external input portion may transmit an input signal to the external input signal receiving portion by wireless means. This arrangement expands the range of possible locations for projector placement.

The projector pertaining to this first aspect may further comprise a data decision portion for deciding, during projection display and/or after projection display of image data and via the external input portion, the next set of data to be received via the network. By providing the above arrange ment, continuous projected display of image data becomes possible. As a result, the time required for a presentation etc. can be reduced.

In the projector pertaining to this first aspect, the projection display portion may comprise an electro optical data output portion, a light source for illuminating the electro optical data output portion, and a lens for enlarging images projected by the light source.

The projector pertaining to this first aspect may further comprise an image data conversion portion for converting a projected image to image data; and a storage device for storing the converted image data. By providing the above arrangement, projected images can be stored electronically. There may additionally be provided a date/date/time stamp portion for appending to the image data the image data conversion date/time or save date/time. This arrangement facilitates searching for image data.

The projector pertaining to this first aspect may further comprise an enhancement portion for applying enhancements to a projected image; the image data conversion portion may be provided with the function of converting such enhanced images to enhanced image data; and the date/date/time stamp portion may be provided with the function of appending the date/time of enhancement or the date/time the enhanced image data is saved. By providing the above arrangement, enhanced images can be saved electronically, and searches for enhanced image data are facilitated.

The projector pertaining to this first aspect may further comprise an image data associating portion for associating a plurality of items of image data by means of association data described in markup language (ML) format. This arrangement allows items of image data to be associated with each other. The image data associating portion may be provided with the function of chronologically associating a plurality of items of image data, using either the image data conversion date/time or save date/time. This arrangement enables chronological management of image data. The projection display portion may be provided with the function of reading and projecting saved image data. This arrangement enables saved image data to be readily projected without having to be reacquired from the server computer.

The projector pertaining to this first aspect may further comprise an image data associating portion for associating a plurality of items of image data and enhanced image data by means of association data described in markup language (ML) format. This arrangement allows items of image data and enhanced image data to be associated with each other. The image data associating portion may be provided with the function of chronologically associating a plurality of items of enhanced image data and image data, using either the image data enhancement date/time or enhanced image data save date/time in the case of enhanced image data, or the image data conversion date/time or save date/time in the case of image data other than enhanced image data. This arrangement enables chronological management of image data and enhanced image data. The projection display portion may be provided with the function of reading and projecting saved enhanced image data and/or image data. This arrangement enables saved image data and/or enhanced image data to be readily projected without having to be reacquired from the server computer.

In the projector pertaining to this first aspect, a storage device may be connected to the network for saving enhanced image data in the storage device connected to the network. This arrangement allows storage devices of various formats to be used, and allows the use of low-cost, high-capacity storage devices.

In the projector pertaining to this first aspect, the projector may function as a terminal device for an application service provider (ASP). This arrangement expands possible modes of ASP utilization.

In a second aspect, the invention provides a display system wherein results of operations performed by a server computer are displayed via a plurality of projectors connected over a network. In the display system of this second aspect the server computer comprises display screen data generating means provided for each projector, for executing operations in response to a request from a projector and generating display screen data; and display screen data transmitting means for transmitting the generated display screen data to the projector requesting the operations; and the projector comprises transmitting/receiving means for transmitting a request for operations to the server computer via the network and receiving display screen data transmitted from the server computer; image data generating means for generating image data for display on the basis of the received display screen data; and projection display means for projecting the generated image data.

According to the display system which pertains to the second aspect of the invention, a projector may be connected to a network without the aid of a computer. The projector can also function as an ASP terminal at an ASP.

In the display system which pertains to this second aspect, display screen data generated by display screen data generating means of the server computer may have a unique format and consist of differential data for previous display screen data and current display screen data, and the image data generating means of the projector may use a client application to generate the image data on the basis of the display screen data.

In the display system which pertains to this second aspect, the projector may be a projector for an application service provider (ASP). This arrangement expands possible modes of ASP utilization.

In a third aspect, the invention provides a method for displaying images via a projector connected to a network. The method pertaining to this third embodiment of the invention comprises the steps of in a server computer connected to the network, executing an application in response to a request from a client and transmitting to the requesting client and projector via the network user interface data resulting from execution of the application; and in the projector, receiving the transmitted user interface data, generating image data for display on the basis of the received user interface data, and projecting the generated image data.

According to the method of this third aspect, a projector may be connected to a network without the aid of a computer. A projector may also be used via a network. The projector may serve as the client.

In a fourth aspect, the invention provides a method for displaying multimedia data that includes still image data, motion video data, and audio data, via a projector connected to a network. The method pertaining to this fourth embodiment of the invention comprises the steps of in a server computer connected to the network, transmitting multimedia data requested by means of a client request to the requesting client and the projector; and in the projector, receiving the transmitted multimedia data, loading a suitable application for playback of the received multimedia data, play
ing back the multimedia data via the loaded application;
projecting playback still video or playback motion video from the played back multimedia data; and
outputting playback audio data from the played back multimedia data.

According to the method of this fourth aspect, a projector may be connected to a network without the aid of a computer. A projector may also be used via a network. Multimedia data including still image data, motion video data, and audio data can be played back by the projector. The projector may serve as the client.

BRIEF DESCRIPTION OF THE DRAWINGS

FIG. 15 is an illustrative diagram showing an exemplary descriptor for associating date/time stamp data using hyper text markup language (HTML) as the markup language (ML);

BEST MODE FOR CARRYING OUT THE INVENTION

A fuller understanding of the projection type display device, i.e. projector, of the invention is provided through the following description in the indicated order, making frequent reference to the accompanying drawings.

A. Projector Arrangement in a First Embodiment

Figure 1:
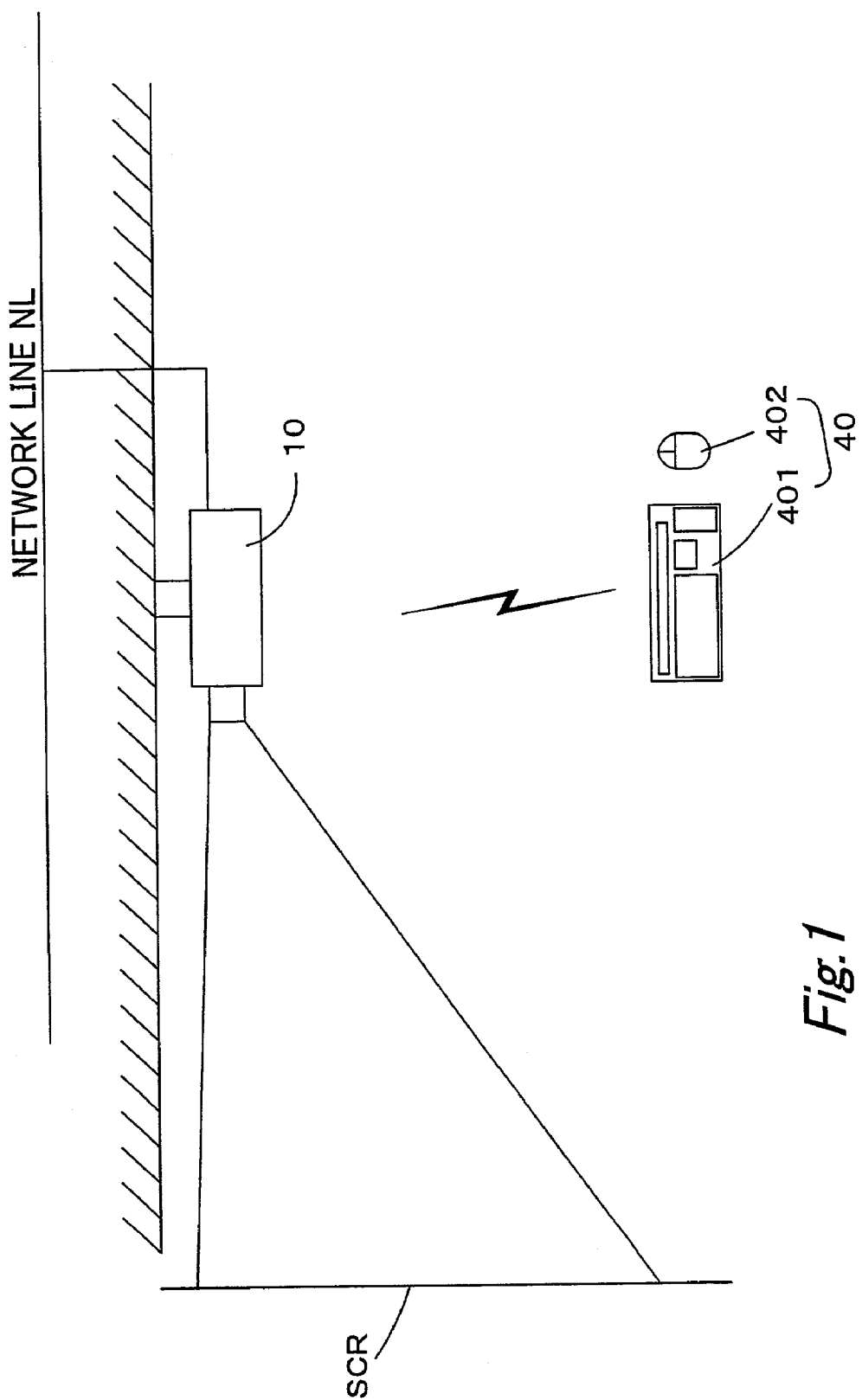
FIG. 1 is an illustrative diagram showing an exemplary arrangement for a projector pertaining to a first embodiment.
Figure 2:
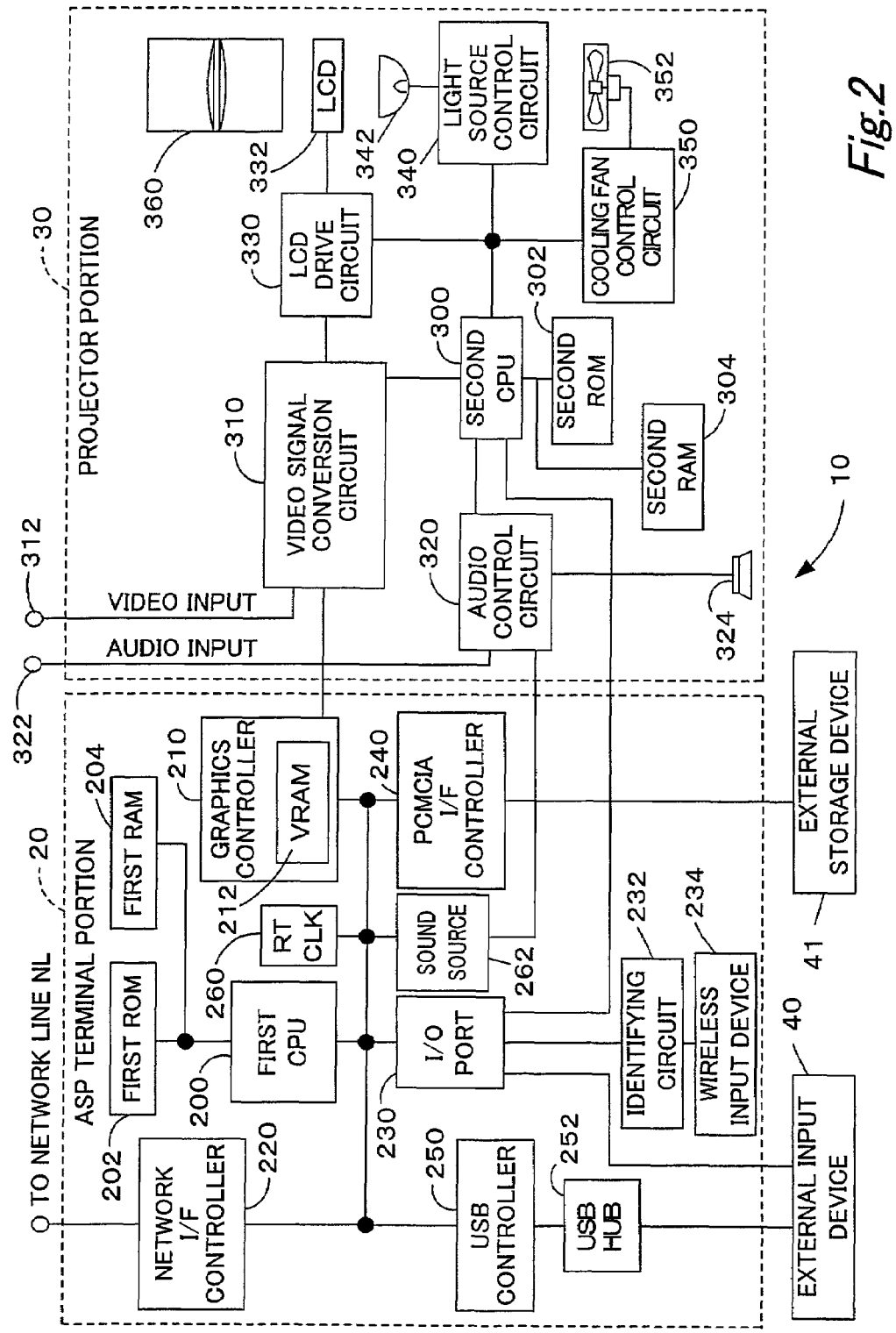
FIG. 2 is a block diagram showing the internal circuit arrangement of the projector of the first embodiment.

The following description of the arrangement of a projection type display device, i.e. projector pertaining to a first embodiment makes reference to FIGS. 1 and 2. FIG. 1 is an illustrative diagram showing an exemplary arrangement for a projector pertaining to a first embodiment. FIG. 2 is a block diagram showing the internal circuit arrangement of the projector of the first embodiment.

Projector 10 is installed, for example, suspended from the ceiling as depicted in FIG. 1, and acquires necessary data and commands via a network line NL. Commands and data may be input to projector 10 via a wireless external input device 40, for example, a wireless keyboard 401 or wireless mouse 402. Images from projector 10 are projected onto a projection screen SCR or other projection surface.

The following description of the internal arrangement of the projector 10 of the first embodiment makes reference to FIG. 2. Projector 10 comprises an ASP terminal portion 20 primarily functioning as an ASP terminal, and a projector portion 30 primarily functioning as a conventional projector. That is, the projector 10 of the first embodiment can function as an ASP terminal for an ASP.

ASP terminal portion 20 comprises a first central processing unit (CPU) 200 for executing operations of various kinds, including executing viewer applications and client applications for the ASP; a first read-only memory (ROM) 202 storing various programs, including viewer applications and client applications for execution by first CPU 200; and a first random access memory (RAM) 204 for temporarily storing results of operations by first CPU 200, data, etc. First CPU 200 and first ROM 202 are connected so as to enable one-way or two-way communication; first CPU 200 and first RAM 204 are connected so as to enable two-way communication.

ASP terminal portion 20 further comprises a graphics controller 210 connected to first CPU 200 so as to enable two-way communication, for generating image data in response to a Draw command from first CPU 200. Graphics controller 210 has an LSI chip (not shown) for generating images, and video memory (VRAM) for storing generated images (display images).

As interfaces for exchanging commands and data between projector 10 and external devices, ASP terminal portion 20 further comprises a network interface controller 220, an I/O port 230, a PCMCIA interface controller 240, and a USB controller 250. Network interface controller 220 is, for example, an Ethernet controller for converting commands and data sent from ASP terminal portion 20 to network line NL to a format appropriate to the network communications protocol, or converting signals received over network line NL to a format suitable for processing by ASP terminal portion 20. I/O port 230 is an ordinary input/output port, connected via an identifying circuit 232 to a wireless input device 234, and also to an external input device 40 and to a second CPU 300 of projector portion 30. Wireless input device 234 is an input device for receiving input data via wireless transmission from a wireless input device, and identifying circuit 232 identifies whether received by wireless input device 234 is input data specifically transmitted to it.

PCMCIA interface controller 240 is a controller for transferring data from ASP terminal portion 20 to an external device and transferring data from an external device to ASP terminal portion 20 according to the PCMCIA standard; it is connected, for example, to an external storage device 41. USB controller 250 is a controller for transferring data between ASP terminal portion 20 and an external device according to the USB standard, and is connected, for example, to external input device 40 via a USB hub 252.

ASP terminal portion 20 further comprises a real time clock 260 for providing absolute time in ASP terminal portion 20, and a sound source 262 for generating sound data in response to a command from first CPU 200.

In ASP terminal portion 20 the first CPU 200 and the various controllers are interconnected via a bus for data and command exchange.

The arrangement of projector portion 30 is now described. Projector portion 30 comprises a second central processing unit (CPU) 300 for executing a predetermined program to control the various circuits of projector portion 30; a second read-only memory (ROM) 302 for storing the program for execution by the second CPU 300; and a second random access memory (RAM) 304 for temporarily storing results of operations by second CPU 300, data, etc. Second CPU 300 and second ROM 302 are connected so as to enable one-way or two-way communication; second CPU 300 and second RAM 304 are connected so as to enable two-way communication.

Projector portion 30 further comprises a video signal conversion circuit 310, an audio control circuit 320, a liquid crystal (LCD) drive circuit 330, a light source drive circuit 340, a cooling fan control circuit 350, and a projection optical system 360.

Video signal conversion circuit 310 performs an analog/digital conversion function, a decoding function, a sync signal separation function, and an image processing function. Specifically, video signal conversion circuit 310 converts an analog video signal or digital video signal input from an external video signal input terminal 312 into a digital video signal, and in sync with the sync signal writes the converted digital video signal to a frame memory (not shown) in video signal conversion circuit 310, or reads from frame memory digital video data that has been written to the frame memory. Analog signals include, for example, an RGB signal output from a personal computer, or a composite video signal output from a video tape recorder, etc. Where the analog signal is a composite video signal, video signal conversion circuit 310 demodulates the composite video signal, separates the component video signals (the three color signals RGB) and the sync signal, and converts the component video signals into digital video data. Where the analog signal is an RGB signal output from a personal computer, as the signal is input in the form of the native component video signals, with the sync signal separate, a separation process is unnecessary, so the video signal conversion circuit 310 simply converts the component video signals into digital video data.

Video signal conversion circuit 310 can also input digital signals transmitted from the graphics controller 210 of ASP terminal portion 20. In this case, the native digital signal is input and the sync signal is supplied separately, so analog/digital conversion and separation processes are not needed.

Audio control circuit 320 is connected to an external audio signal input terminal 322, a speaker 324, second CPU 300, and the sound source 262 of ASP terminal portion 20. Audio control circuit 320 is connected to second CPU 300, and under instructions from second CPU 300 drives speaker 324 by means of a drive signal generated from an audio signal or from sound data transmitted from external audio signal input terminal 322 or sound source 262.

LCD drive circuit 330 receives image data processed by video signal conversion circuit 310 and drives LCD 332 according to the received image data to modulate the illumination from light source 342. The modulated illumination is projected via a lensed projection optical system onto a projection surface, for example, a projection screen. Light source control circuit 340 is connected to light source 342; this light source control circuit 340 controls the ON/OFF etc. of light source 342 under instructions from second CPU 300. To the rear of light source 342 is arranged a cooling fan 352 for directing cooling air onto light source 342. Cooling fan 352 is connected to cooling fan control circuit 350, and cooling fan control circuit 350 controls the operating speed, etc. of cooling fan 352 under instructions from second CPU 300.

B. Basic Operation of Projector According to the First Embodiment

The following description of basic operation of a projector 10 pertaining to the first embodiment comprising the above arrangement makes reference to FIGS. 1 and 2.

A signal input to projector 10 via network line NL is converted by the network interface controller 220 of ASP terminal portion 20 to a format appropriate for the ASP terminal portion 20, and data and commands are transferred to first CPU 200. First CPU 200 temporarily places the transferred data in first RAM 204 and determines if a transferred command is a command addressed to ASP terminal portion 20 or a command addressed to projector portion 30. If a transferred command is addressed to projector portion 30, first CPU 200 transfers the command to the second CPU 300 of projector portion 30 via I/O port 230. Data transferred to first RAM 204 includes binary application data; image data having the extensions JPEG, GIF, etc.; motion video data having the extensions avi, mov, rpm, etc.; and audio data having the extensions WAV, MP3, etc.

Where a transferred command is directed to the ASP terminal portion 20, on the other hand, first CPU 200 executes operations on the basis of the transferred command. Where data placed in first RAM 204 is, for example, image data or the like, first CPU 200 loads a viewer application suitable for the data (i.e., the extension) from first ROM 202, and generates user interface data from the data in first RAM 204, which is then transferred to graphics controller 210 together with a Draw command. Where data in first RAM 204 is audio data, first CPU 200 reads an audio data playback application from first ROM 202, generates playback audio data, and transfers this to sound source 262 together with a Generate Audio command. Where data is motion video data containing audio, the motion video data frame image data and a Draw command are transferred to graphics controller 210, while playback audio data and a Generate Audio command are transferred to sound source 262 in sync with the frame image data.

Where projector 10 alternatively functions as a server computer based computing (SBC) client, described later, the corresponding client application is loaded, and a Draw command is transmitted to graphics controller 210 to generate user interface screen data from received display screen data having a unique format. In response to the received Draw command, graphics controller 210 generates user interface data or user interface display screen data for display on the basis of display screen data (hereinafter "image data") which is then stored in VRAM 212 in graphics controller 210.

Under an instruction from first CPU 200, graphics controller 210, at a predetermined timing, reads image data placed in VRAM 212 in graphics controller 210, and transfers it to the video signal conversion circuit 310 of projector portion 30. First CPU 200 receives a command or data from external input device 40 via USB hub 252, USB controller 250 or I/O port 230. In accordance with a command received via external input device 40 or network line NL, first CPU 200 takes data placed in first RAM 204 or image data placed in the VRAM 212 of graphics controller 210 via PCMCIA interface controller 240, and stores it in external storage device 41.

When video signal conversion circuit 310 receives image data from graphics controller 210 it executes the routine described earlier and transfers the processed data to LCD drive circuit 330. LCD drive circuit 330 drives LCD 332 in response to the received image data so that the desired image data is projected onto the projection screen.

When a command received by second CPU 300 from, for example, network line NL via I/O port 230, is a command instructing it to turn light source 342, it turns on light source 342 via light source control circuit 340. In response to the temperature of light source 342, second CPU 30 controls the operating status (fan speed, timing, etc.) via cooling fan control circuit 350.

Data transmission from projector 10 to network line NL is performed by network interface controller 220 under instructions from first CPU 200.

As described hereinabove, the projector 10 pertaining to the first embodiment can function as a terminal device in an ASP. Projector 10 can be connected to a network, and control thereof and data transmission can be accomplished via network line NL. In the first embodiment the designation "ASP terminal portion 20" is used, but it is not always necessary to use the "ASP terminal portion" designation, it being possible to use the designation "network terminal portion". That is, it is sufficient to send and receive commands and data via network line NL.

C. Working Examples of Projector 10 Pertaining to the First Embodiment

A fuller understanding of the projector 10 of the first embodiment furnished with the above arrangement is provided through several embodiments serving as working examples of various modes for reduction to practice thereof.

(a) Second Embodiment (First Working Example)

Figure 3:
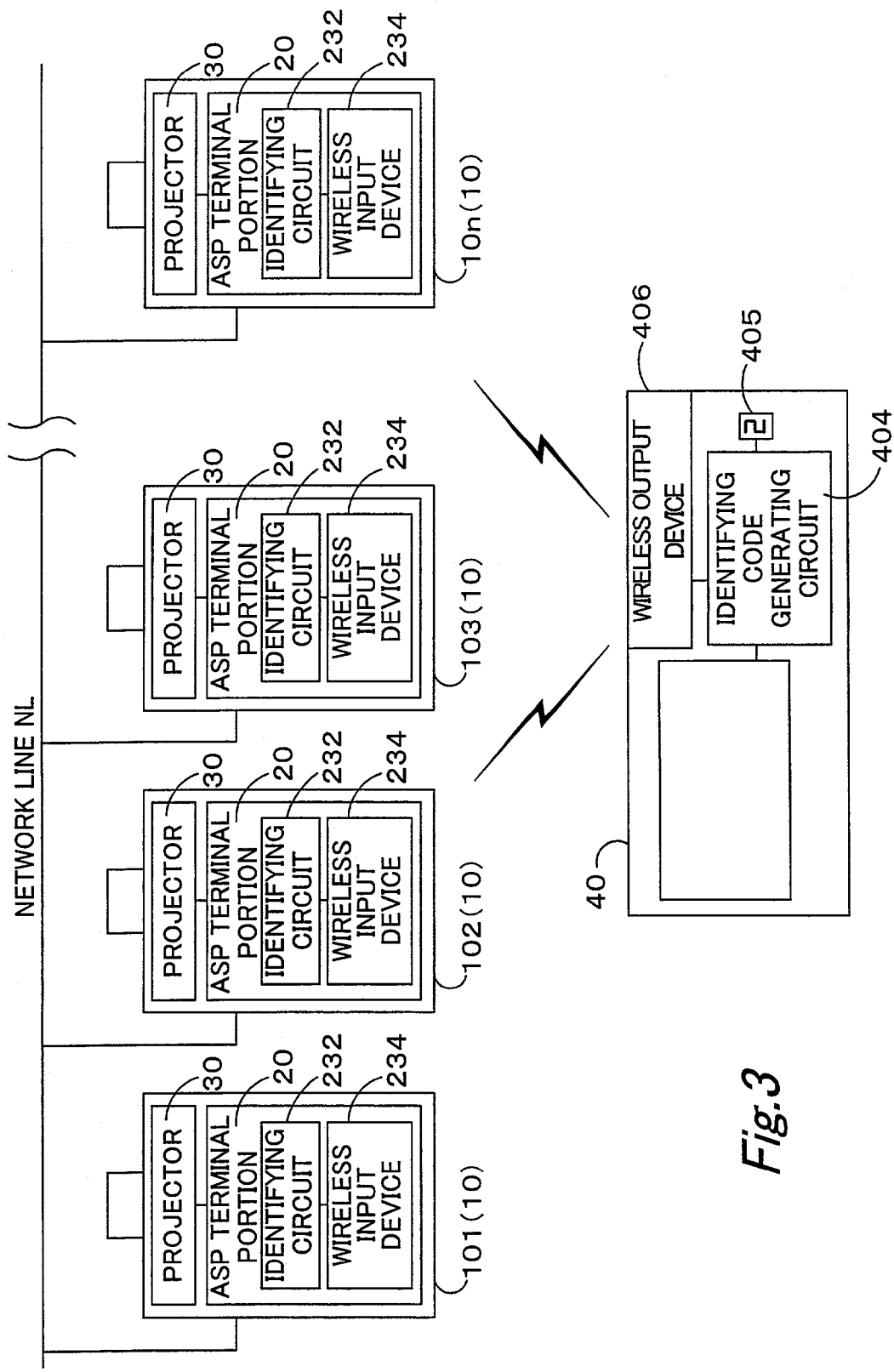
FIG. 3 is an illustrative diagram depicting control of a plurality of projectors 10 by a single external input device 40 according to a second embodiment.

The following description of a second embodiment (first working example) wherein a plurality of projectors 10 according to the first embodiment are controlled by a single external input device 40 makes reference to FIG. 3. FIG. 3 is an illustrative diagram depicting control of a plurality of projectors 10 by a single external input device 40 according to this second embodiment.

As noted, the projector 10 according to the first embodiment comprises an identifying circuit 232 whereby individual projectors 101, 102, 103 . . . 10n (10) may be uniquely identified. Accordingly, where external input device 40 comprises an identifying code generating circuit 404, a target projector display window 405, and a wireless output device 406, one can individually control a plurality of projectors 101, 102, 103 . . . 10n using a single external input device 40. This is useful, for example, where independent images are projected using a plurality of projectors 10 in a presentation, or where a single superimposed image is projected by two projectors 10. The plurality of projectors 101, 102, 103 10n are interconnected via network line NL and also connected to a server computer (not shown). Via network line NL, the plurality of projectors 101, 102, 103 . . . 10n make requests to the server computer (not shown) for operations of various kinds. In response, the server computer returns the operations results to the requesting projector.

In actual practice, first, a key combination is input to external input device 40 to select a projector 10 to which it is desired to input a command or data by means of external input device 40. A possible key combination is a combination of the CTRL key and a number key. Once a key combination is input, identifying code generating circuit 404 generates a unique identifying code for the selected projector 101, 102, 103 . . . 10n and displays the number of the selected projector 10 in the target projector display window 405. In the illustrated example, a "2" is displayed in the target projector display window 405, indicating that the second projector 102 has been selected.

By subsequently pressing a key on external input device 40—a character key, for example—the identifying code generated by identifying code generating circuit 404 is appended to the transmitted data and transmitted from wireless output device 406 to the wireless input device 234 of projector 10. Transmitted data is composed of header information, the identifying code, a character code, and an end command, in that order.

Upon receiving data transmitted from external input device 40 via wireless input device 234, each projector 101, 102, 103 . . . 10n determines in the identifying circuit thereof whether the identifying code is the identifying code indicating itself. For example, when the first projector 101 receives the transmitted data in the present example, it will discard the received transmitted data since it does not contain the identifying code indicating itself. On the other hand, when the second projector 102 receives the transmitted data, since the transmitted data contains the identifying code indicating itself, it will transfer the received transmitted data to ASP terminal portion 20, whereupon the data is processed by ASP terminal portion 20 and sent to the server computer via network line NL. The server then executes operations on the basis of this information and returns the results of the operations to projector 102. In ASP terminal portion 20 an image reflecting the operation results is projected from projector portion 30.

Another procedure for selecting a projector 101, 102, 103 . . . 10n—besides inputting key combinations—is to provide a plurality of switches on external input device 40 so that individual projectors 101, 102, 103 . . . 10n can be selected by turning on an individual switch, or be turning on some combination of switches.

In the second embodiment described hereinabove, an external input device 40 capable of generating a plurality of identifying codes for projectors 101, 102, 103 . . . 10n each having a unique identifying code is used to input commands or data, thereby allowing a plurality of projectors 101, 102, 103 . . . 10n to be individually controlled by means of a single external input device. Accordingly, there is no need to provide a dedicated external input device 40 for each projector 101, 102, 103 . . . 10n.

(b) Third Embodiment (Second Working Example)

Figure 4:
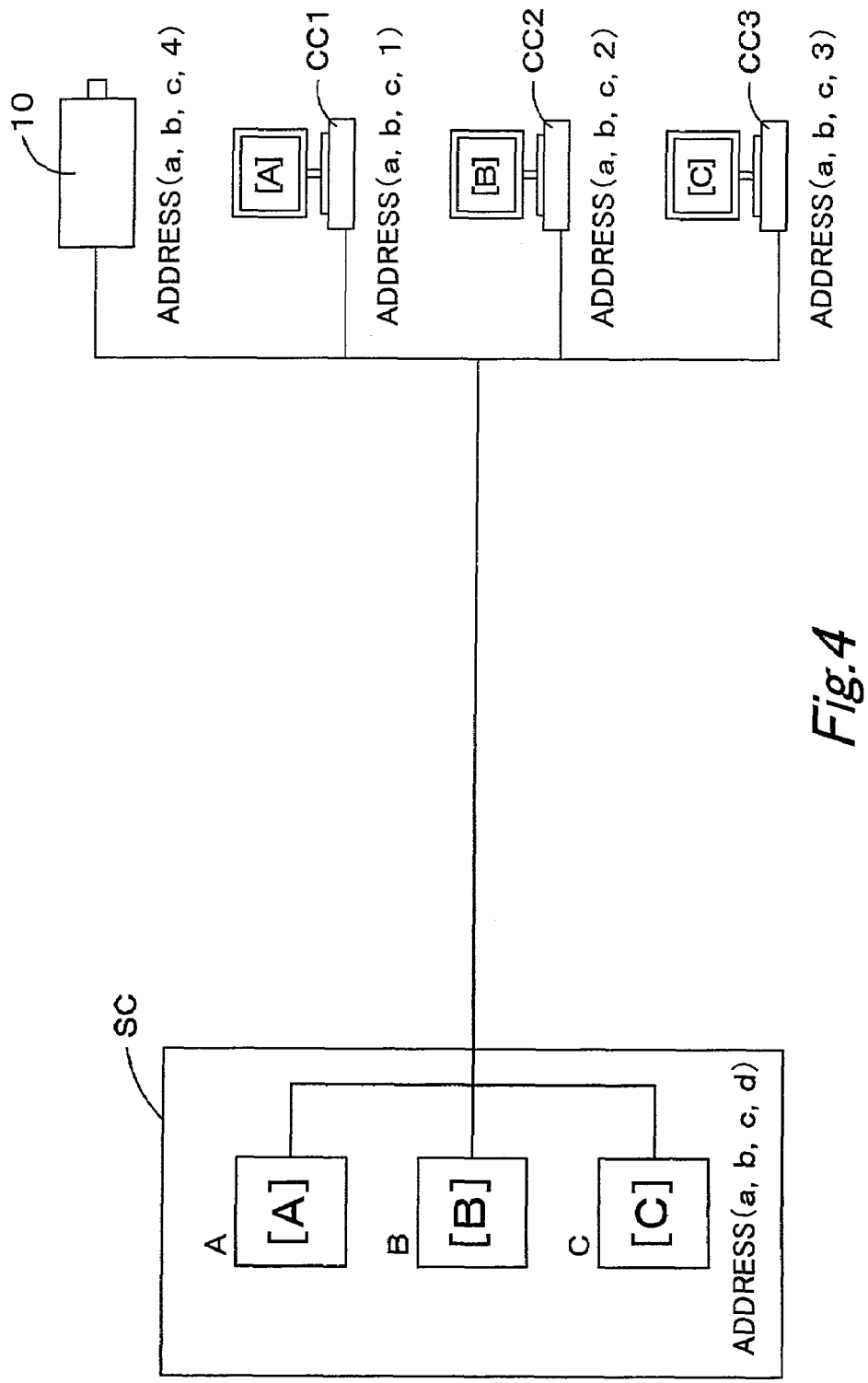
FIG. 4 is an illustrative diagram depicting in simplified form an arrangement of a network system in a third embodiment.
Figure 5:
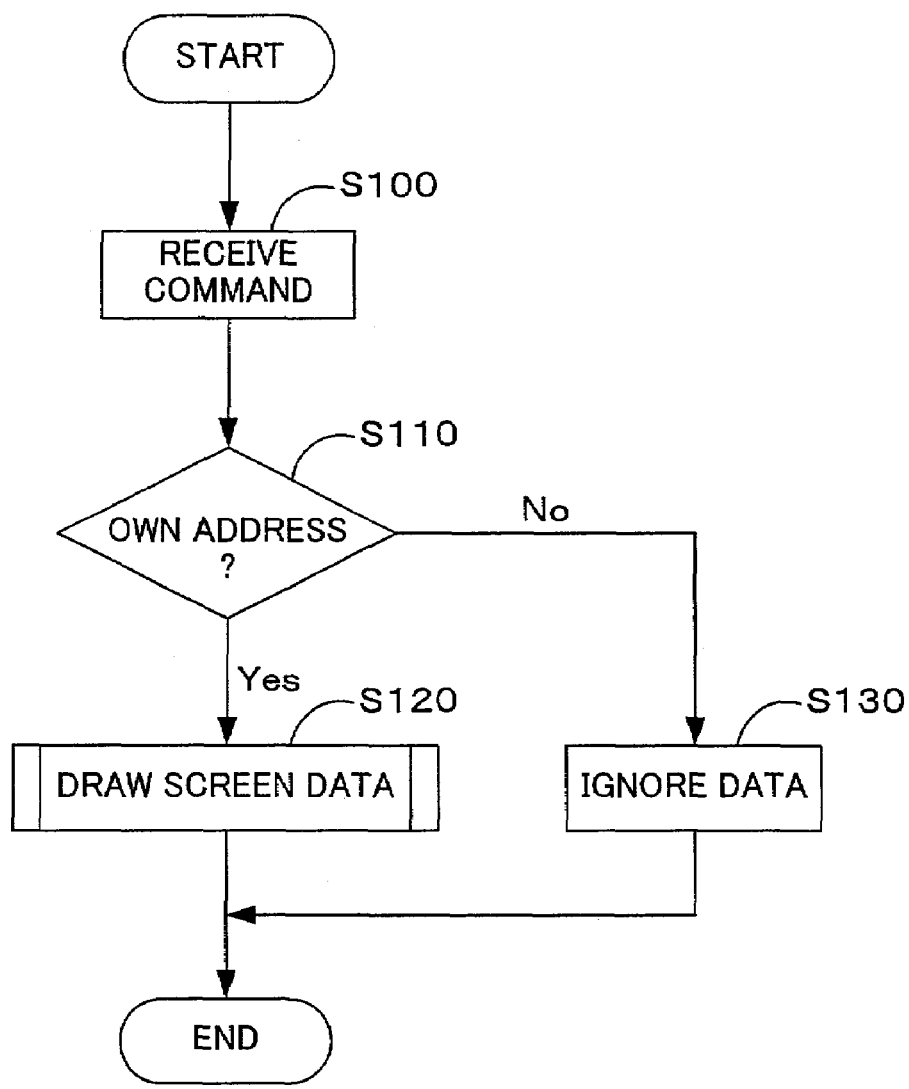
FIG. 5 is a flow chart of a routine executed by a client computer upon receipt of a command in the third embodiment.
Figure 6:
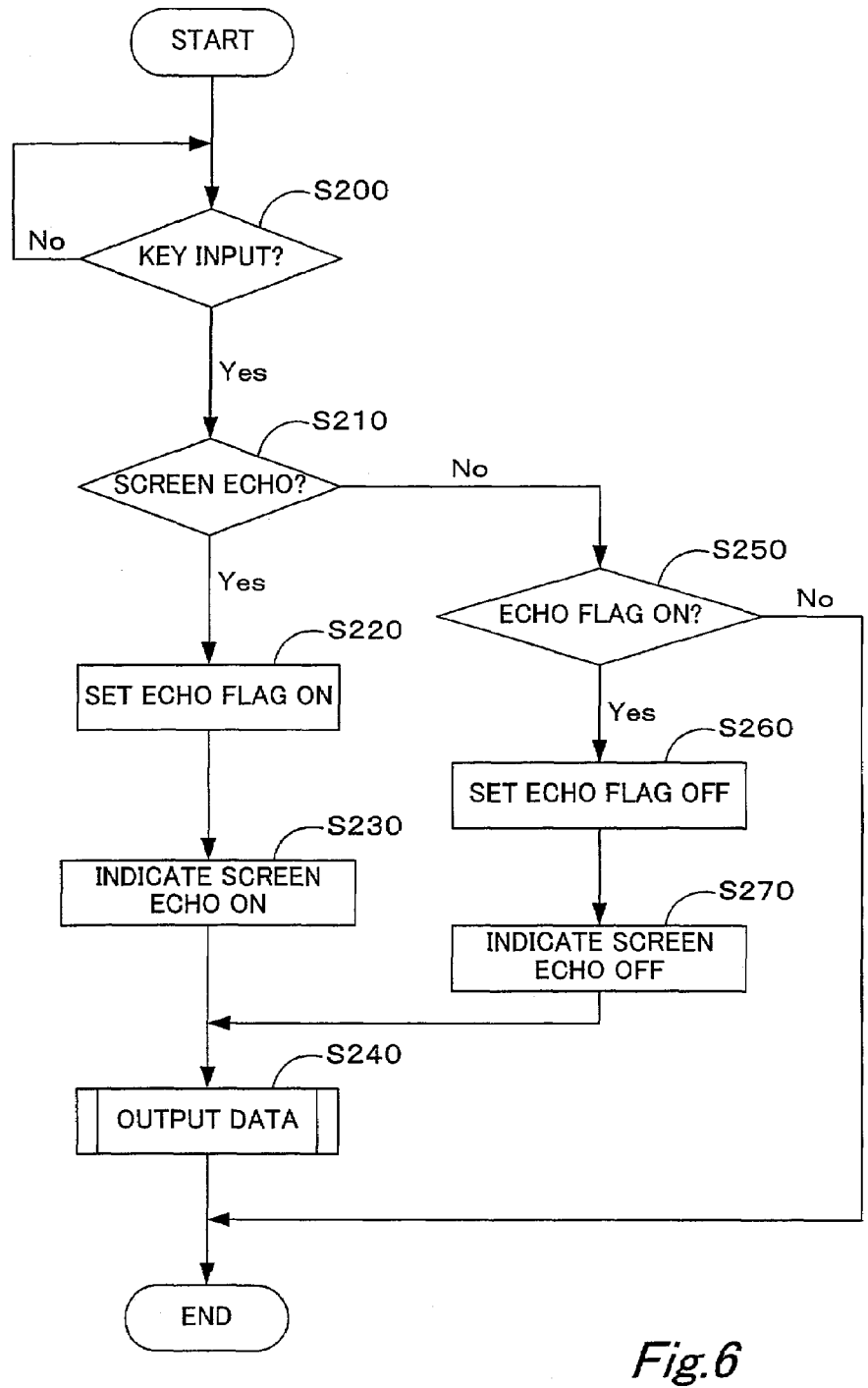
FIG. 6 is a flow chart of a routine executed by a server computer when a display image on a client is projected via a projector 10 in the third embodiment.
Figure 7:
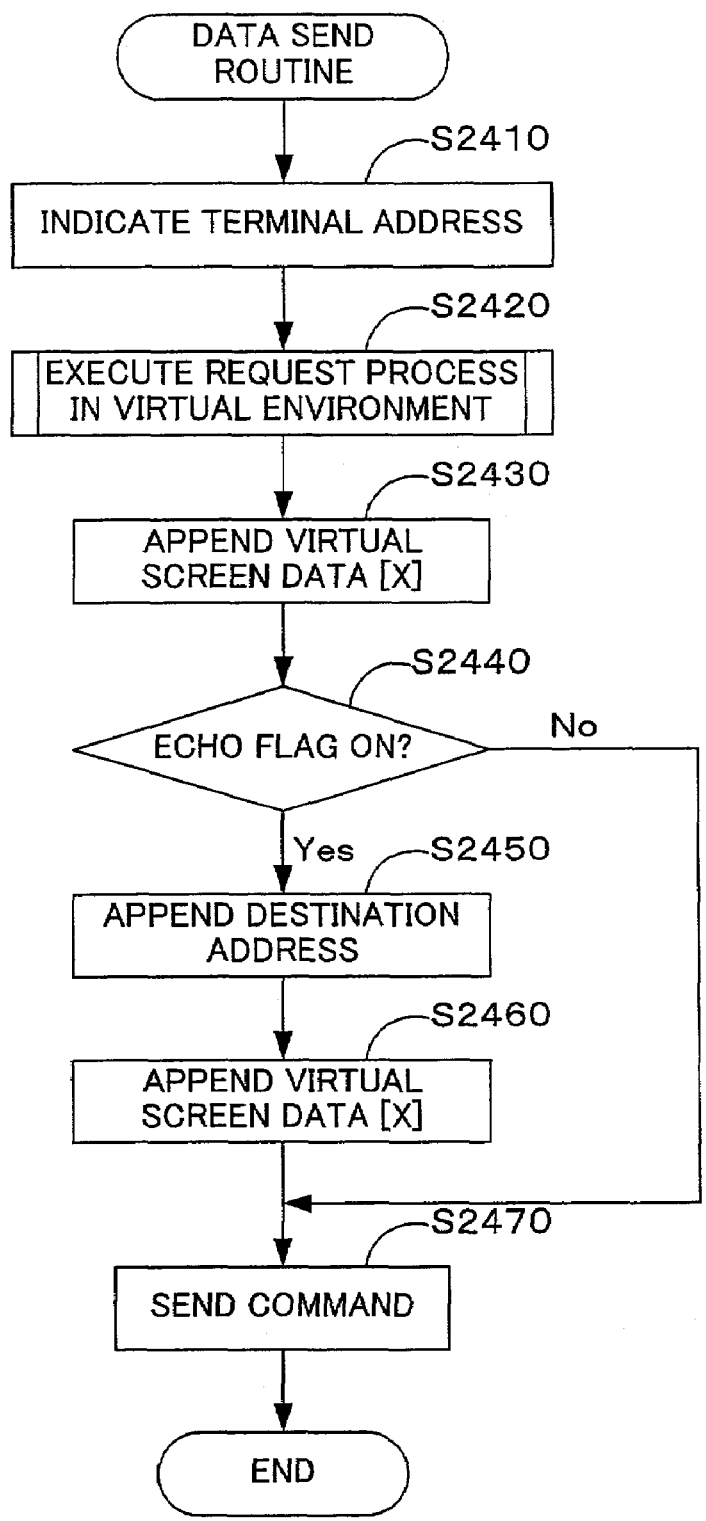
FIG. 7 is a flow chart showing the details of a routine for data transmission in FIG. 6.
Figure 8:
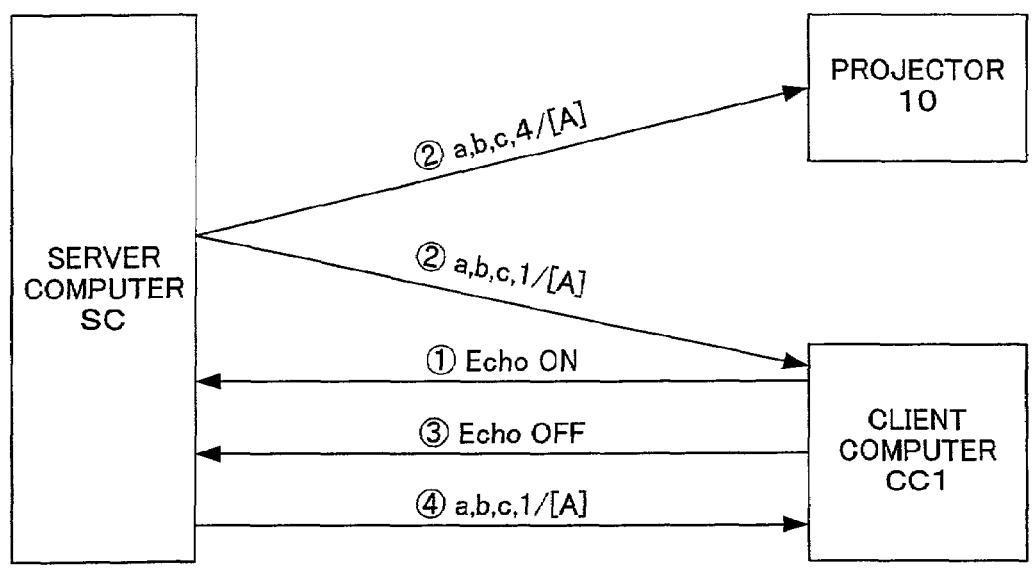
FIG. 8 is an illustrative diagram depicting in conceptual form exchange of commands between a server computer, client, and projector 10.

The following description of a third embodiment (second working example) of the projector 10 pertaining to the first embodiment makes reference to FIGS. 4-8. FIG. 4 is an illustrative diagram depicting in simplified form an arrangement of a network system in the third embodiment. FIG. 5 is a flow chart of a routine executed by a client computer upon receipt of a command. FIG. 6 is a flow chart of a routine executed by a server computer when a display image on a client is projected via a projector 10. FIG. 7 is a flow chart showing the details of a routine for data transmission in FIG. 6. FIG. 8 is an illustrative diagram depicting in conceptual form exchange of commands between a server computer, client, and projector 10.

The following description of a network system embodying this third embodiment makes reference to FIG. 4. A server computer SC is connected via a network line NL to three client computers CC1, CC2, CC3, and a projector 10. The network address (a, b, c, d) is assigned to server computer SC, and the network addresses (a, b, c, 1), (a, b, c, 2), (a, b, c, 3) are assigned respectively to client computers CC1, CC2, CC3. The network address (a, b, c, 4) is assigned to projector 10. Server computer SC is provided with virtual environments A, B, C for each of the client computers CC1, CC2, CC3, i.e., a "server based computing" (SBC) system architecture. Virtual environments A, B, C are created on the server computer SC to enable application programs to be run in response to requests from client computers CC1, CC2, CC3, and appear as virtual independent operating environments to client computers CC.

Each client computer CC1, CC2, CC3 comprises a network interface, input device, and display screen device (not shown), and function as terminal devices (ASP terminal devices) in an SBC system.

In an SBC system, applications, for example a spreadsheet or word processor, are run on the server computer SC; only user interface data (virtual screen data) for the application is transmitted to the client computer CC. However, in an SBC system virtual screen data is displayed on the client computer CC associated with a particular virtual environment, which is inconvenient where a screen displayed on a single client computer CC is to be shared by several users. In the present working example, the projector 10 pertaining to the present embodiment is used to project the display screen displayed on a single client computer CC, improving convenience in cases where a display screen is shared by several users. For example, in a classroom situation, where a lesson involves each student operating a client computer CC, by projecting the display screen of one student's computer using projector 10, all of the students can share the display screen displayed on the client computer CC of the one student.

The following description of operation of client computers CC, server computer SC, and projector 10 where the projector 10 of the present embodiment is implemented in the SBC system depicted in FIG. 4 makes reference to FIGS. 5-7. In the following description, A, B . . . denote independent virtual operating environments created on server computer SC, and [A], [B] . . . denote virtual screen data generated in the virtual environments on server computer SC.

As shown in FIG. 4, virtual screen data [A], [B], [C] is created in each of the virtual operating environments A, B, C on server computer SC. The client computers CC1, CC2, CC3 and projector 10 (hereinafter "clients") receive a command via network line NL (Step S100).

Referring to FIG. 5, each client determines if the address indicated by the received command matches its own network address (Step S110). If determined that it does not match its own network address (Step S110: No), it ignores the received command (Step S130). If, on the other hand, the client determines that the address indicated by the received command matches its own network address (Step S110: Yes), it draws a display for the virtual screen data (Step S120). The data sequence transmitted from server computer SC contains, for example, the sequence: (indicated network address/virtual screen data [X]); where client computer CC1 is indicated, this sequence will be: (a, b, c, 1/[A]).

The following description of a routine for displaying on projector 10 a display screen displayed on a client computer CC and for erasing a screen displayed on projector 10 makes reference to FIG. 6. To simply the description, client computer CC1 is used as a representative example.

When client computer CC1 detects key input from an input device, it transmits the key input information to server computer SC.

Server computer SC waits for key input from client computer CC1 (Step 200: No), and if key input has occurred (Step 200: Yes) it determines whether the key input is a command to turn on screen echo (Step S210). Here, "screen echo" indicates a command for the projector 10 to project an image. If the server computer SC determines that the key input is a command to turn on screen echo (Step S210: Yes) it turns on an ECHO flag (Step S220) and indicates that screen echo is on (Step S230). Server computer SC then executes data output processing (Step S240) and terminates the routine.

If, on the other hand, a display screen displayed on projector 10 is to be erased, a command to turn off screen echo will be issued by means of key input from client computer CCl; therefore, server computer SC determines that the key input is a screen echo off command (Step S210: No) and then determines whether the ECHO flag is on (Step S250). If the server computer SC determines that the ECHO flag is not on (Step S250: No), it terminates the routine. If on the other hand server computer SC determines that the ECHO flag is on (Step S250: Yes), it turns the ECHO flag off (Step S260) and indicates that screen echo is off (Step S270). Server computer SC then executes data output processing (Step S240) and terminates the routine.

The following detailed description of data output processing makes reference to FIG. 7. The server computer SC indicates the network address (terminal address) of the transmitting client computer CC (Step S2410). The server computer SC then executes the processing requested by the transmitting client computer CC, for example, a spreadsheet calculation or word processor text input, in the corresponding virtual environment (Step S2420). The server computer SC then appends to the Answer command virtual display screen data [X]—namely, image data resulting from execution of the application in the virtual environment (Step 2430). That is, it appends to the Answer command user interface data (a screen for display on the display screen) for the application.

The server computer SC then determines whether the ECHO flag is on (Step S2440), and if it determines that the ECHO flag is on (Step S2440: Yes), it indicates as the destination address the destination network address for display of display screen data on the display screen (i.e., the network address of projector 10), and appends this to the Answer command (Step S2450). The network address of projector 10 is assumed to be preregistered with server computer SC. Alternatively, it could be appended automatically to an access request by projector 10 by means of a directory server or the like. Server computer SC appends to the end of the destination address virtual screen data [X] for projection by projector 10 (Step S2460), and transmits the Answer command to the transmitting client computer CC and projector via network line NL (Step S2470).

In response to an echo on command from client computer CC1 (FIG. 8 (1)), server computer SC transmits the virtual screen data indicated by (2) in FIG. 8 to projector 10 and the transmitting client computer CC1. While not shown in FIG. 8, the command indicated by (1) in FIG. 8 also includes the network address of the transmitting device, and the server computer SC identifies the transmitting client computer CC from this network address.

Upon receiving virtual screen data [A] from server computer SC, as described earlier projector 10 loads a client application in ASP terminal portion 20, and graphics controller 210 generates image data from virtual screen data [A] for transmission to video signal conversion circuit 310. The image data generated by graphics controller 210 is projected onto projection screen SCR via video signal conversion circuit 310 and LDC drive circuit 330.

If server computer SC determines that the ECHO flag is off (Step S4540: No), it transmits an Answer command—without appending a destination address, etc.—to the transmitting client computer CC over network line NL. That is, in response to an EchoOff command from client computer CC1 ((3) in FIG. 8) server computer SC transmits to the transmitting client computer CC1 the virtual screen data indicated by (4) in FIG. 8. While not shown in FIG. 8, the command indicated by (3) in FIG. 8 also includes the network address of the transmitting device, and the server computer SC identifies the transmitting client computer CC from this network address.

In the event that projector 10 does not receive virtual screen data [A] or does not receive differential screen data from server computer SC, it projects image data based on the last-received virtual screen data onto projection screen SCR. That is, it projects previously drawn data stored in the VRAM 212 of graphics controller 210 (or in the frame memory of video signal conversion circuit 310).

According to the third embodiment described hereinabove, in an SBC, a display screen displayed on one of a plurality of client computers can be projected by projector 10. Accordingly, the display screen can be shared by a number of users, a function not possible in SBCs to date. Projector 10 may function as a thin client, since there is no need for it to perform numerous functions. In the present embodiment, the client computers are ordinary personal computers, but the projector 10 pertaining to the present embodiment could be used as a client computer. In this case, a plurality of projectors 10 would be connected to a server computer SC via a network, and each projector 10 would request the server computer SC for data that it desires to project (i.e. for which projection has been indicated via an input device).

(c) Fourth Embodiment (Third Working Example)

Figure 9:
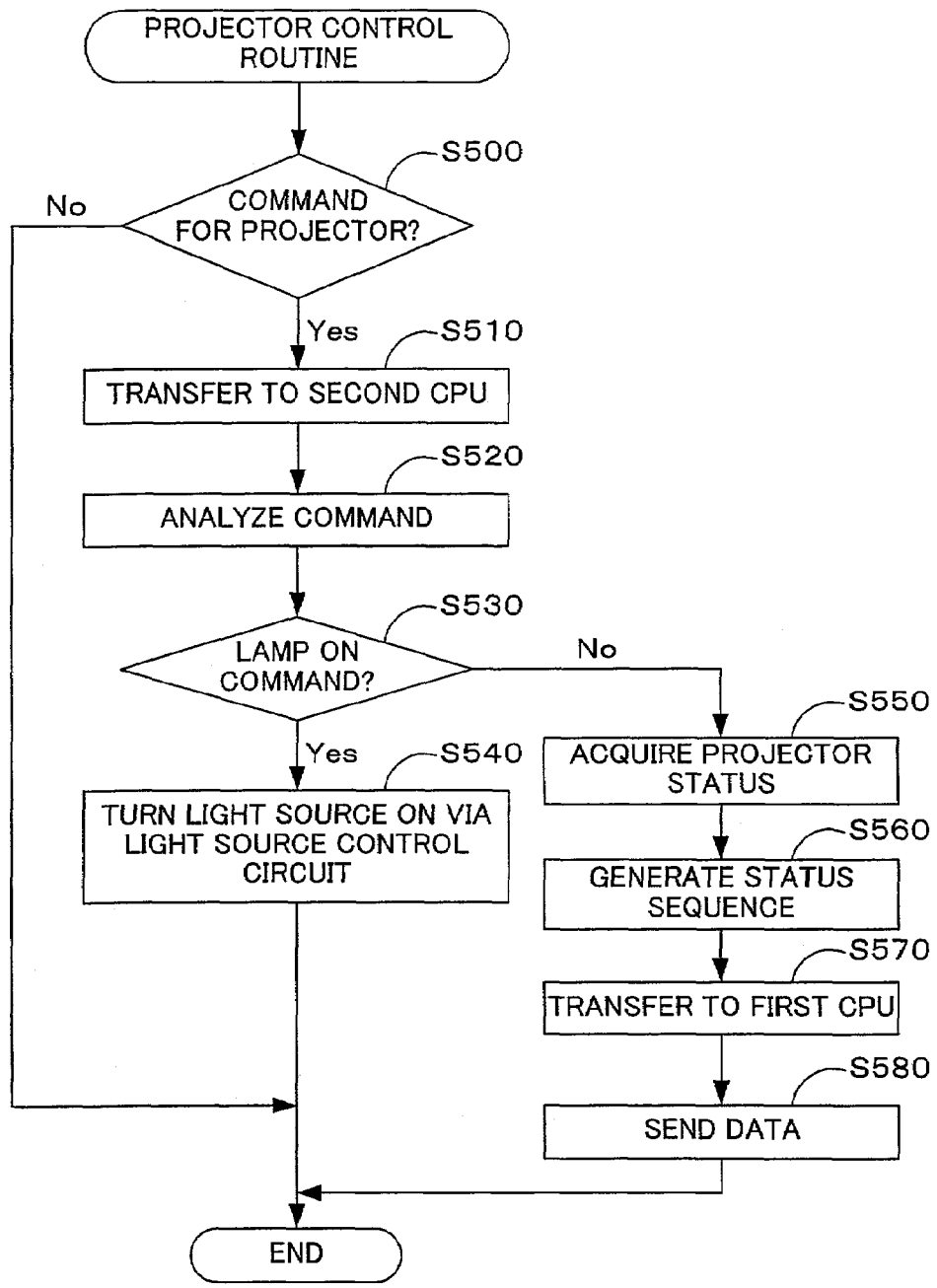
FIG. 9 is a flow chart of a routine executed in a fourth embodiment, for remote operation, via a network line NL, of a projector 10 pertaining to the first embodiment.

The following description of a fourth embodiment (third working example) wherein the projector 10 pertaining to the first embodiment is operated remotely via a network line NL makes reference to FIG. 9. FIG. 9 is a flow chart of a routine for remote operation, via a network line NL, of a projector 10 pertaining to the first embodiment. A server computer or personal computer is connected to network line NL, enabling one-way management of a plurality of projectors 10 via these computers by means of remote operation.

Upon receiving a command via network line NL, the first CPU 200 of ASP terminal portion 20 determines whether the received command is a command addressed to projector portion 30 (Step S500). Specifically, it determines whether the received command is, for example, a command relating to control of projector 10, such as a Lamp On command indicating that light source 342 (lamp) should be turned on. If the first CPU 200 determines that the received command is a command addressed to projector portion 30 (Step S500: Yes), it transfers the command to second CPU 300 via I/O port 230 (Step S510). If, on the other hand, CPU 200 determines that the received command is not a command addressed to projector portion 30 (Step S500: No), CPU 200 terminates the routine and executes the process instructed by the command.

Upon receiving a command from first CPU 200, second CPU 300 analyzes the command (Step S520) to determine whether the received command is a Lamp On command (Step S530). If second CPU 300 determines that whether the received command is a Lamp On command (Step S530: Yes), it turns on light source 342 via light source control circuit 340 (Step S540).

If second CPU 300 determines that the received command is not a Lamp On command (Step S530: No), it acquires status data for projector portion 30 (Step S550) and arranges the acquired status data in a predetermined order to generate a status sequence (Step S560). Projector portion 30 status data refers herein to status data relating to projection functions, for example, cumulative service time for light source 342, cooling fan 352 operating status, and light source (lamp) burnout. Second CPU 300 then transfers the generated sequence to first CPU 200 (Step S570).

Upon receiving the status sequence, first CPU 200 sends the received status sequence to the requesting computer via network interface controller 220 (Step S580).

The fourth embodiment employs the projector 10 according to the first embodiment—furnished with an ASP terminal portion 20 capable of receiving commands and data—whereby the projector 10 may be operated remotely via a network line NL. For example, where a plurality of projectors 10 are provided, the status of each individual projector 10 can be ascertained by acquiring status data, without polling each individual projector 10. On the projector 10 side, the need to wait before operating the projector 10 is obviated, making it possible, for example, to both manage the projector 10 and control presentation data simultaneously by means of a personal computer. The command used in the preceding description of remote operation is merely exemplary; naturally, various other commands besides a Lamp On command could be used.

(d) Fifth Embodiment (Fourth Working Example)

Figure 10:
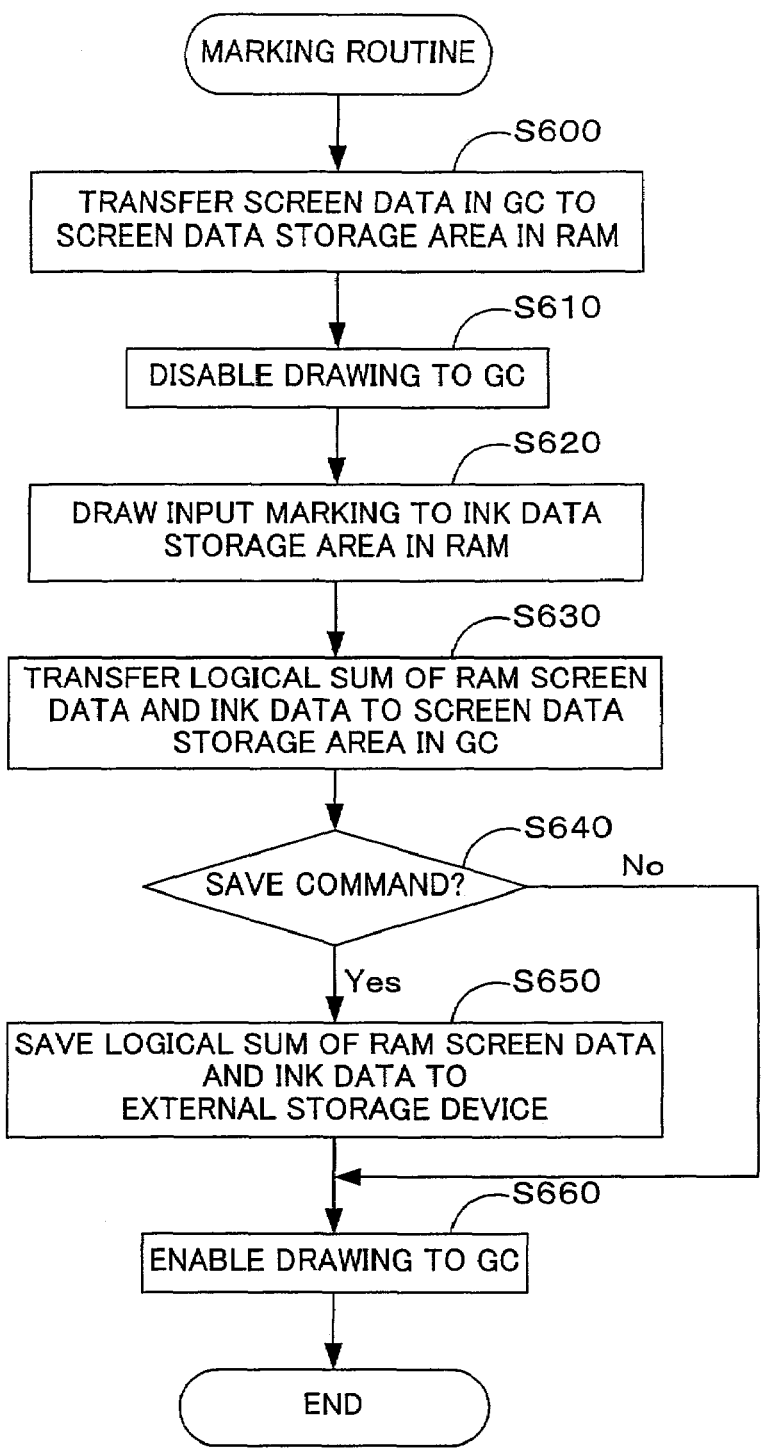
FIG. 10 is a flow chart of a routine for executing marking in a fifth embodiment.
Figure 11:
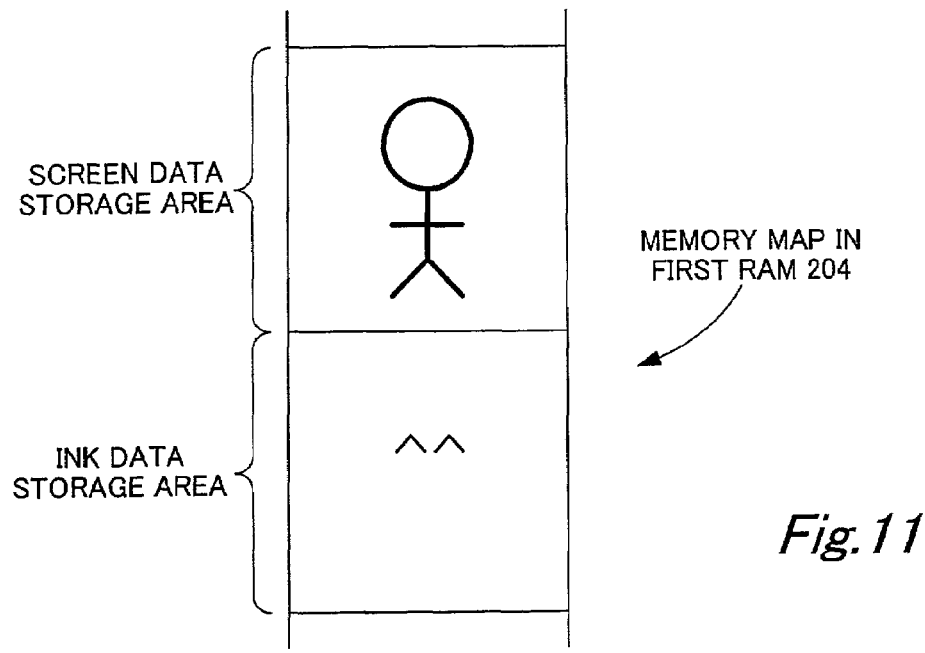
FIG. 11 is an illustrative diagram depicting in conceptual form a memory map in first RAM 204.
Figure 12:
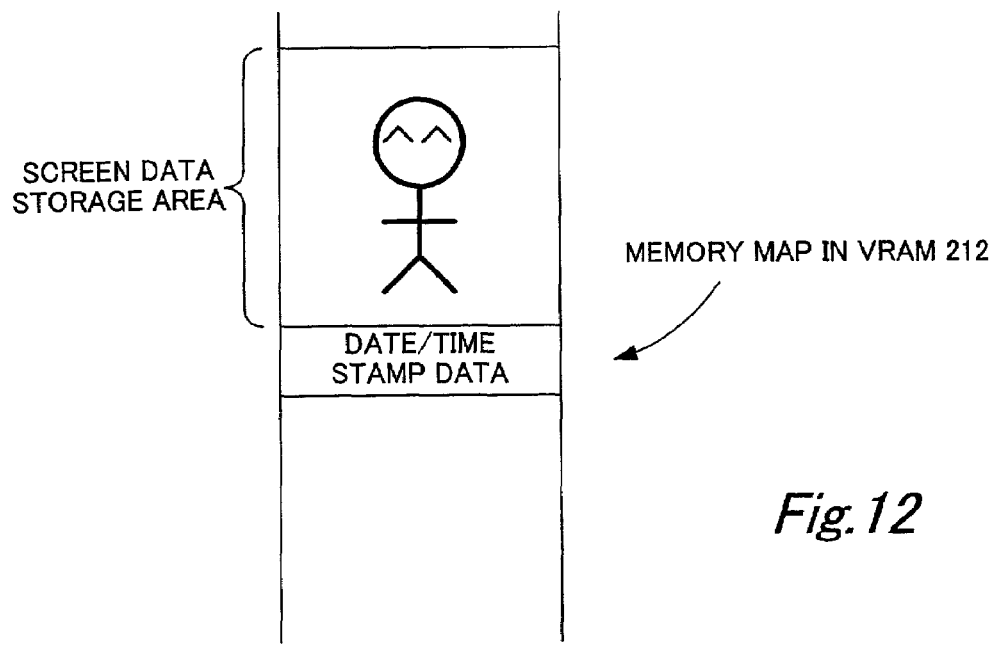
FIG. 12 is an illustrative diagram depicting in conceptual form a memory map in VRAM 212.
Figure 13:
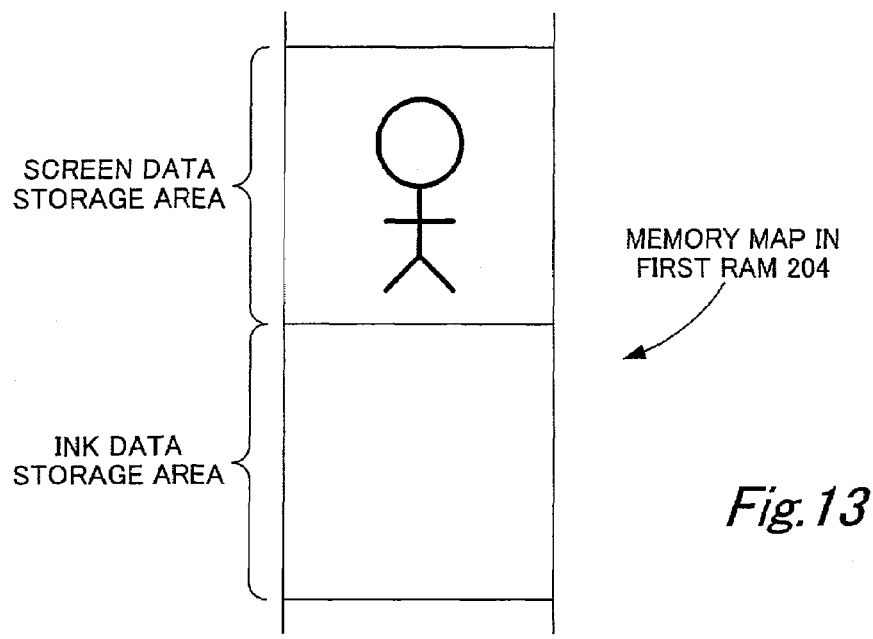
FIG. 13 is an illustrative diagram depicting in conceptual form a memory map in first RAM 204 in the absence of marking.
Figure 14:
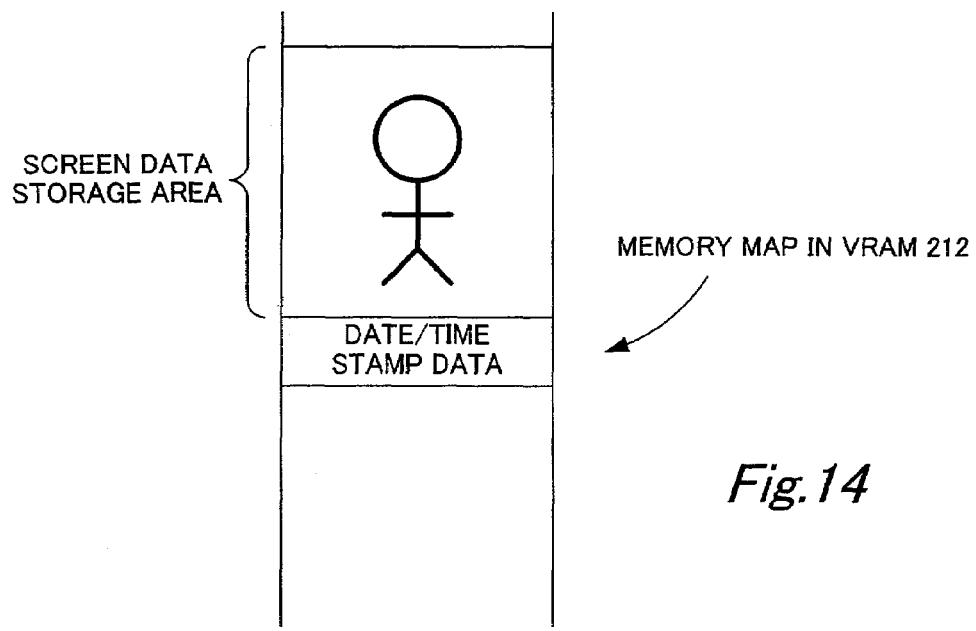
FIG. 14 is an illustrative diagram depicting in conceptual form a memory map in VRAM 212 in the absence of marking.

The following description of a fifth embodiment (fourth working example) wherein the projector 10 pertaining to the first embodiment is used for "marking", e.g. writing on a projected image, makes reference to FIGS. 10-15. FIG. 10 is a flow chart of a routine for executing marking in the fifth embodiment. FIG. 11 is an illustrative diagram depicting in conceptual form a memory map in first RAM 204. FIG. 12 is an illustrative diagram depicting in conceptual form a memory map in VRAM 212 where marking data has been input. FIG. 13 is an illustrative diagram depicting in conceptual form a memory map in first RAM 204 in the absence of marking. FIG. 14 is an illustrative diagram depicting in conceptual form a memory map in VRAM 212 in the absence of marking data input. FIG. 15 is an illustrative diagram showing an exemplary descriptor for associating date/time stamp data using hyper text markup language (HTML) as the markup language (ML). The present embodiment is also applicable to instances like those depicted in FIGS. 13 and 14, where an unmarked display screen is simply placed in external storage device 41.

As shown in FIG. 11, when marking is initiated, first CPU 200 transfers the display screen data in graphics controller 210 to a screen data storage area in first RAM 204 (Step S600). The display screen data held in graphics controller 210 represents data for the image currently being projected by projector portion 30. First CPU 200 issues to graphics controller 210 a command disabling drawing to VRAM 212 (Step S610), thereby disabling drawing to VRAM 212 by the LSI chip in graphics controller 210.

On the basis of marking data input via an external input device 40 (e.g. a mouse or tablet), first CPU 200 draws to an ink data storage area within first RAM 204, as shown in FIG. 11 (Step S620). If a display screen is simply being saved, null marking data is placed as ink data in the ink data storage area of first RAM 204. First CPU 200 transfers the logical sum data of the ink data and the display screen data in first RAM 204 to the screen data storage area of VRAM 212 in graphics controller 210 (Step S630). As a result, image data—consisting of the original display screen data prior to marking plus the appended ink data—(see FIG. 12) is stored in the screen data storage area of VRAM 212. Where the ink data storage area of first RAM 204 contains null marking data, the logical sum data is simply the display screen data, and this is placed in the screen data storage area of VRAM 212 (see FIGS. 13, 14). Screen data stored in VRAM 212 is associated, for example, with a date/time stamp data storage area containing date/time stamp data acquired from real time clock 260. Image data stored in the screen data storage area of VRAM 212 is projected via projector portion 30. As used herein, "ink data" refers to data held in first RAM 204, and corresponds to marking data input via an external input device 40 such as a mouse.

First CPU 200 determines whether a Save command instructing that marked display screen data be saved has been input (Step S640). If a Save command has been input (Step S640: Yes), the logical sum data—consisting of the display screen data in first RAM 204 and the ink data—is transferred to external storage device 41 via PCMCIA interface controller 240 (Step S650). Where a display screen is to be stored, only display screen data is transferred to external storage device 41 as logical sum data consisting of display screen data in first RAM 204 and ink data (see FIGS. 13, 14). At this time, date/time stamp data stored in the date/time stamp data storage area may be transferred at the same time, using the date/time stamp data as a frame title.

Date/time stamp data may also be associated by means of a descriptor using a markup language (ML), for example, hyper text markup language (HTML). For example, by using date/time stamp data (0004201200) as the file name for first data and date/time stamp data (0004201201) as the file name for second data, it is possible to associate these by means of HTML text, as shown in FIG. 15.

First CPU 200 then issues a Draw Enable command to the LSI chip of graphics controller 210, again allowing drawing in graphics controller 210 (Step S660).

If first CPU determines that a Save command has not been input (Step S640: No), it issues a Draw Enable command to the LSI chip of graphics controller 210, allowing drawing in graphics controller 210 (Step S660), and then terminates the routine.

According to the fifth embodiment, using the graphics controller 210 of the ASP terminal portion 20, display screen data being projected via projector portion 30 can be marked via an external input device 40. Further, since the marked display screen data is stored in the VRAM 212 of graphics controller 210, the marked display screen data can be saved in an external storage device 41. Even where a display screen is unmarked, the display screen can be saved in the form of display screen data in an external storage device 41, so that in the event that one desires to show a previously projected display screen, there is no need to re-download the display screen or file from the server. This also obviates the need to load applications for converting display screens to display screen data each time that a display screen is downloaded from the server, or for opening files downloaded from the server, thus facilitating acquisition of display screen data.

(e) Sixth Embodiment (Fifth Working Example)

Figure 16:
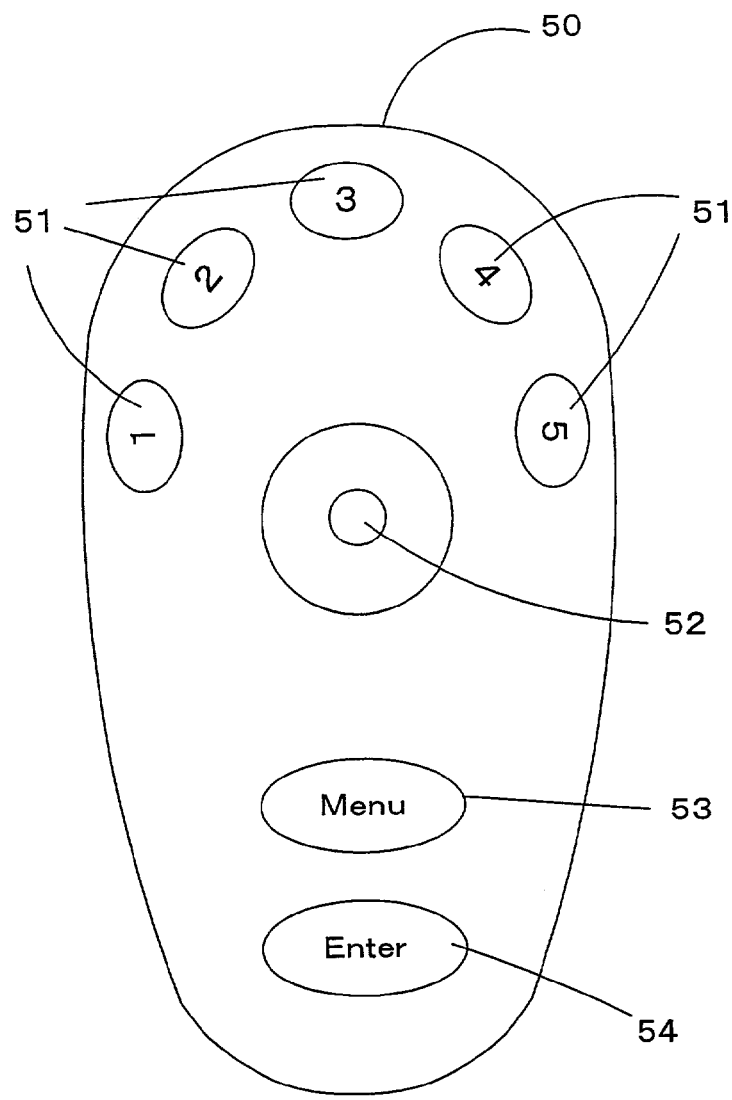
FIG. 16 is an illustrative diagram showing an exemplary remote for transmitting commands such as File Select to a projector in a sixth embodiment.
Figure 17:
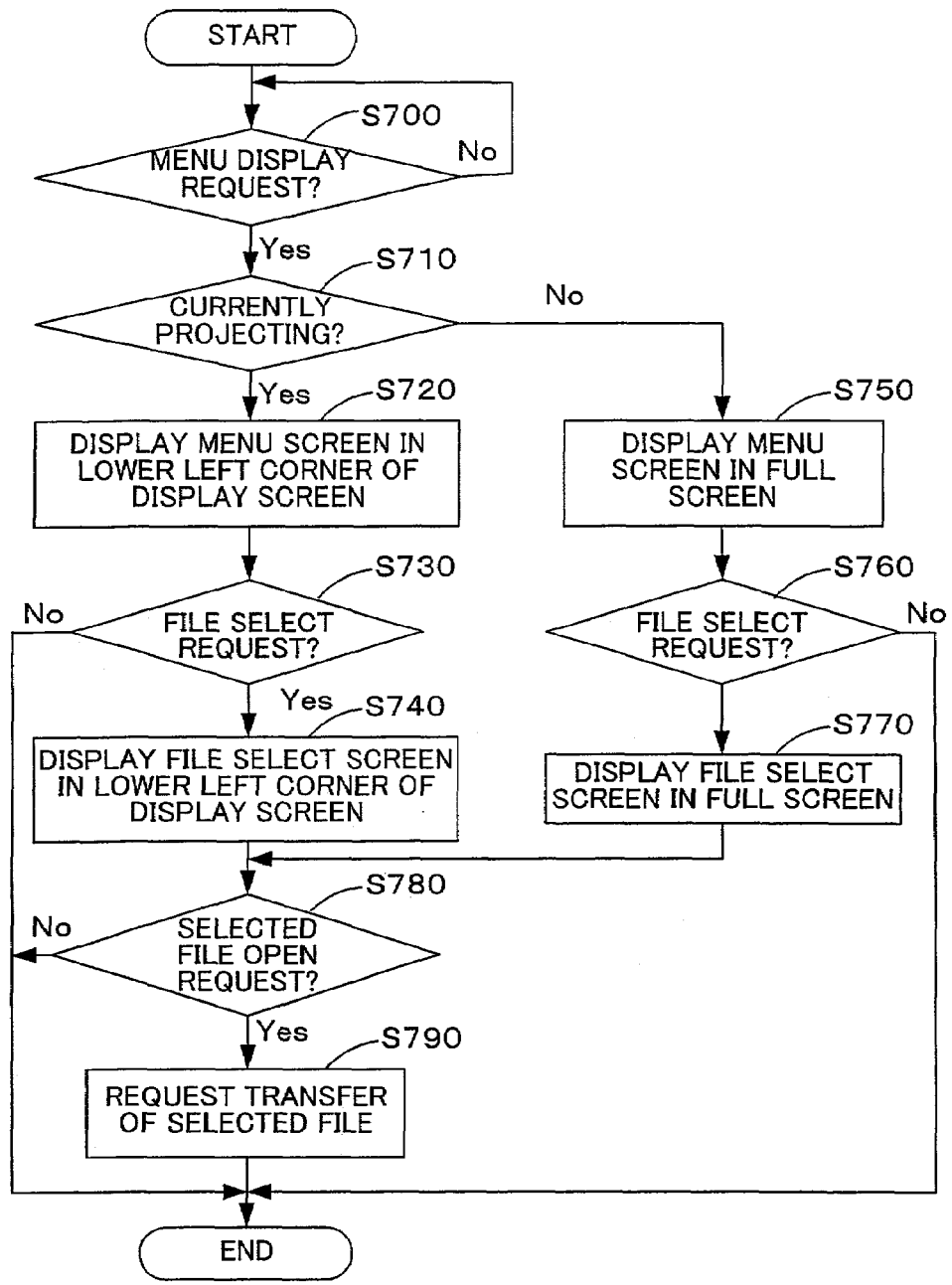
FIG. 17 is a flow chart of a routine for executing projection display data selection processing in the sixth embodiment.
Figure 18:
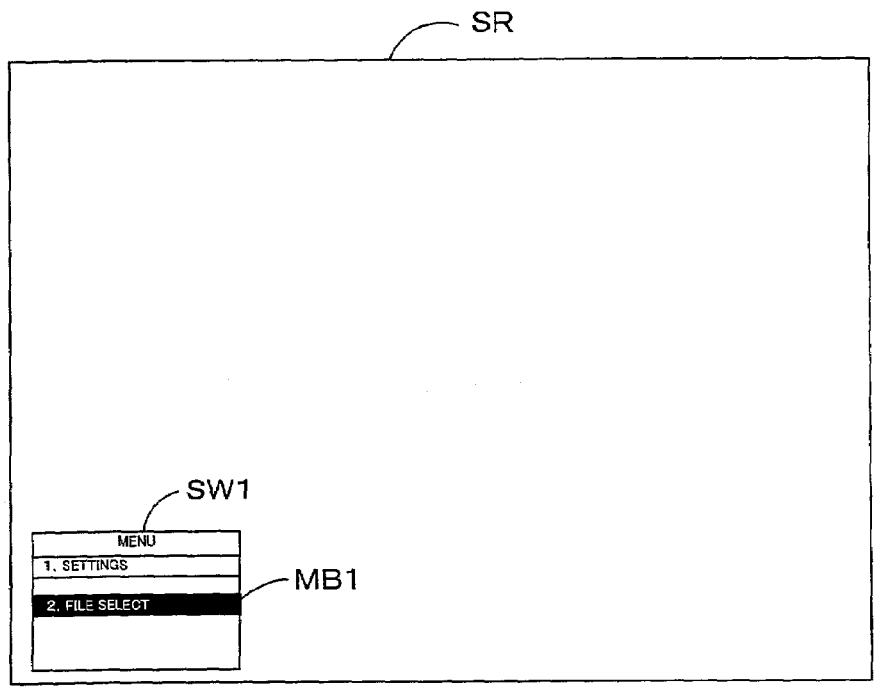
FIG. 18 is an illustrative diagram showing an exemplary Menu screen displayed during projection.
Figure 19:
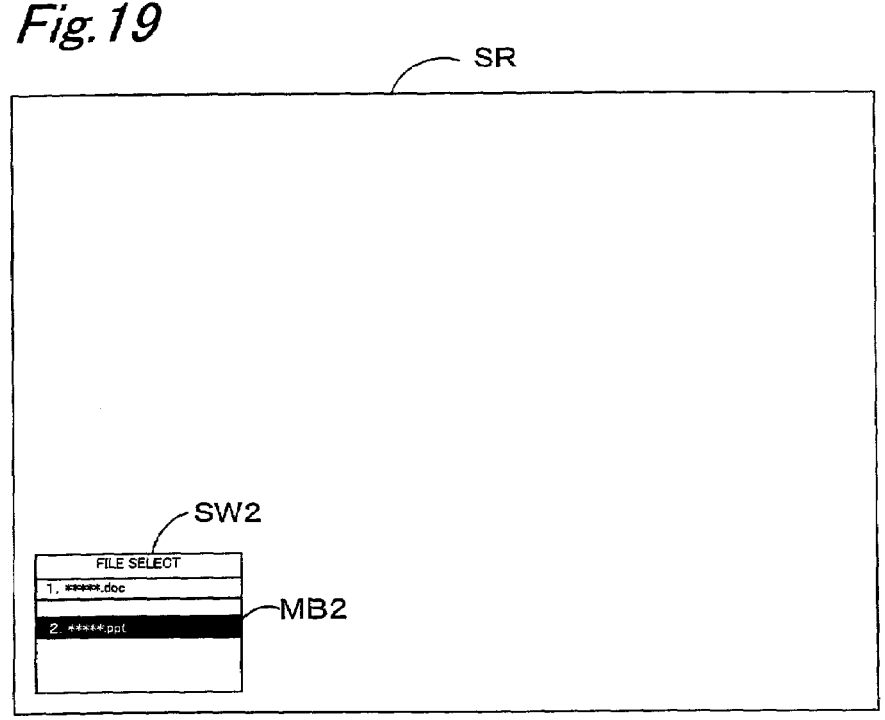
FIG. 19 is an illustrative diagram showing an exemplary File Select screen displayed during projection.
Figure 20:
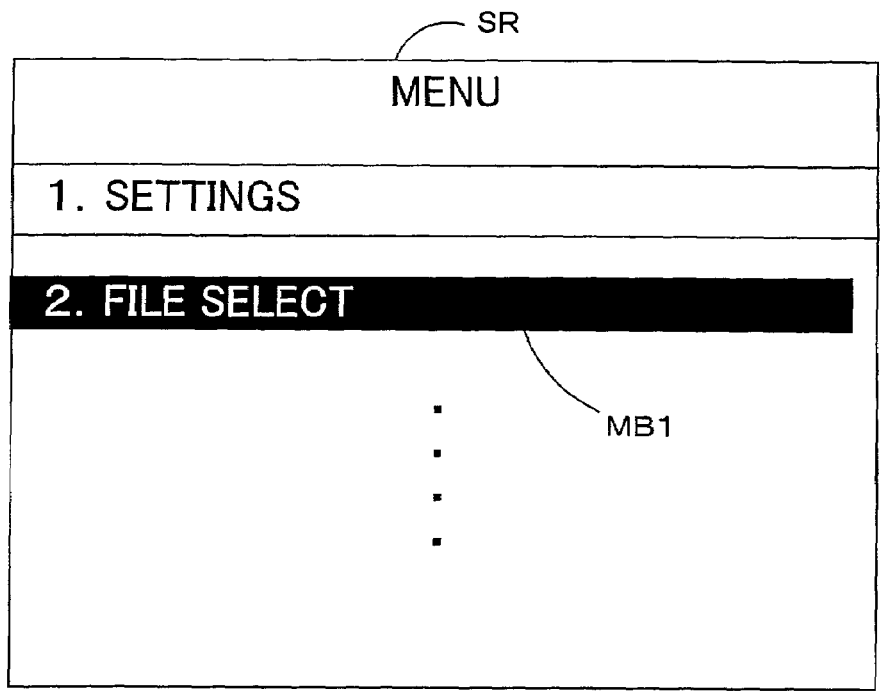
FIG. 20 is an illustrative diagram showing an exemplary Menu screen displayed in the absence of projection.
Figure 21:
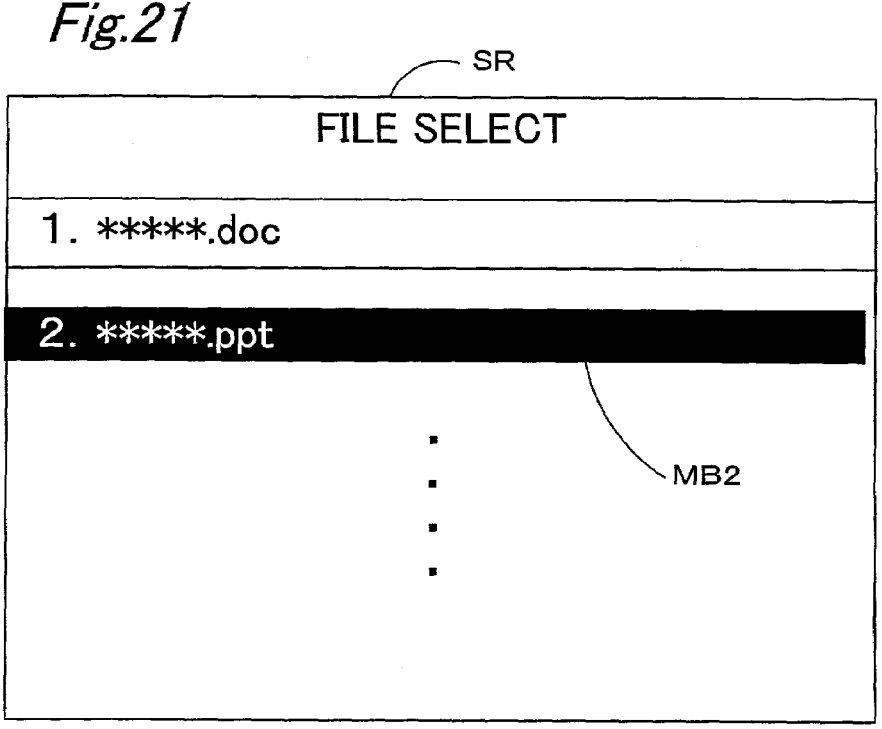
FIG. 21 is an illustrative diagram showing an exemplary File Select screen displayed in the absence of projection.

The following description of a sixth embodiment (fifth working example) wherein the projector 10 pertaining to the first embodiment is used for selecting data for subsequent projection—either during projection of image data or after projection is finished—makes reference to FIGS. 16-21. FIG. 16 is an illustrative diagram showing an exemplary remote for transmitting commands such as File Select to a projector in the sixth embodiment. FIG. 17 is a flow chart of a routine for executing projection display data selection processing in the sixth embodiment. FIG. 18 is an illustrative diagram showing an exemplary Menu screen displayed during projection. FIG. 19 is an illustrative diagram showing an exemplary File Select screen displayed during projection. FIG. 20 is an illustrative diagram showing an exemplary Menu screen displayed in the absence of projection. FIG. 21 is an illustrative diagram showing an exemplary File Select screen displayed in the absence of projection.

In this routine, a remote 50 for transmitting commands comprises number keys 51 numbered 1 to 5, serving as function keys for executing certain predefined functions. Remote 50 further comprises a joystick 52 for moving a cursor or pointer position in any direction on a projected screen SR, a Menu key 53, and an Enter key 54.

The following description of a process for selecting data for subsequent projection, either during projection of image data or after projection thereof is finished, makes reference to FIG. 17. First CPU 200 waits for a menu display request to be issued (Step S700: No), and when a Menu Display request is issued (Step S700: Yes), it determines whether image data is currently being projected (Step S710). If the Menu button 53 of remote 50 is pressed, first CPU 200 decides that a Menu Display request has been issued (input).

If first CPU 200, in communication with second CPU 300, determines that image data is currently being projected (Step S710: Yes), it requests second CPU 300 to display a Menu screen SW1 in the lower left corner of the screen SR being projected by projector 10, as shown in FIG. 18 (Step S720). With Menu screen SW1 displayed, first CPU 200 then determines whether a File Select request has been issued (Step S730). With the "2. FILE SELECT" menu bar MB1 in Menu screen SW1 highlighted using the joystick 52 of remote 50 as shown in FIG. 18, if the Enter key 54 is pressed, first CPU 200 makes the determination that a File Select request has been issued (input).

If first CPU 200 determines that a File Select request has been issued (Step S730: Yes), it requests second CPU 300 to display a File Select screen SW2 in the lower left corner of the screen SR being projected by projector 10, as shown in FIG. 19 (Step S740). If, on the other hand, first CPU 200 does not detect a File Select request (Step S730: No), it terminates the routine.

If in Step S710 first CPU 200 determines that currently there is projection display, it requests second CPU 300 to display a Menu screen coextensive with the screen SR being projected by projector 10, as shown in FIG. 20 (Step S750). With the Menu screen displayed coextensive with the screen SR, first CPU 200 determines whether a File Select request has been issued (Step S760). With the "2. FILE SELECT" menu bar MB1 in the Menu screen shown in FIG. 20 highlighted using the joystick 52 of remote 50 as shown in FIG. 18, if the Enter key 54 is pressed, first CPU 200 makes the determination that a File Select request has been issued (input).

If first CPU 200 determines that a File Select request has been issued (Step S760: Yes), it requests second CPU 300 to display a File Select screen coextensive with the screen SR being projected by projector 10, as shown in FIG. 21 (Step S770). If, on the other hand, first CPU 200 does not detect a File Select request (Step S760: No), it terminates the routine.

Following the processes of Step S740 and Step S770, first CPU 200 determines whether an Open Selected File request has been issued (Step S780). With the menu bar MB2 for a selected file—"2. ***.ppt" in this example—in the File Select screen shown in FIG. 19 or 20 highlighted using the joystick 52 of remote 50, if the Enter key 54 is pressed, first CPU 200** makes the determination that an Open Selected File request has been issued (input).

If first CPU 200 determines that an Open Selected File request has been issued (Step S780: Yes), it requests the server computer SC for the selected file via network line NL (Step S790). First CPU 200 temporarily places the selected file from the server computer SC in first RAM 204 or in external storage device 41, and opens the selected file at the proper timing for projection thereof. If first CPU 200 determines that an Open Selected File request has not been issued (Step S780: No), it terminates the routine.

According to the sixth embodiment, a desired file may be selected for opening via the display screen SR projected by projector 10. Desired files may be selected even while projector 10 is currently displaying image data, thus reducing the time interval at which files can be opened. Where image data is currently being projected, a Menu screen SW1 or File Select screen SW2 appears in the lower left hand corner of the display screen SR projected by projector 10, thereby allowing files to be selected without impairing the view of the image data being projected. Thus, where, for example, one desires to change the open file during a presentation due to time considerations, etc. the desired file can be selected without ending or interrupting the presentation.

The projector herein has been described with reference to certain preferred embodiments and working examples, which are merely intended to facilitate understanding of the invention and are not limiting thereof. Numerous modifications and improvements are possible within the spirit and scope of the invention as set forth in the claims, and such equivalents are covered with the scope of the invention.

As noted hereinabove, in the first embodiment the network terminal portion is designated an "ASP terminal portion 20"; however, the projector 10 is not limited to an ASP terminal, and may simply receive application data (file) via a network, open the file with a viewer application, and project the display screen. Here, file format may be determined and the proper viewer loaded automatically at the projector 10 end, or a Run command instructing the projector 10 to load the proper viewer may be transmitted from the server together with the file.

In the first embodiment, ASP terminal portion 20 and projector portion 30 are each provided with a CPU, RAM and ROM, but these may be provided to the ASP terminal portion 20 only. With such an arrangement, the CPU of the ASP terminal portion 20 will control the projector portion 30.

In the first embodiment, projector portion 30 is provided with an external video signal input terminal 312 and an external audio signal input terminal 322; however, where the projector is designed exclusively for network connection, these may be omitted, image data and audio data being supplied over network line NL.

In the first embodiment there are provided a number of interface controllers, but any of these may be omitted, with the exception of the network interface controller 220.

In the sixth embodiment, a Menu screen SW1 or File Select screen SW2 appears in the lower left hand corner of the display screen SR projected by projector 10, but this is merely exemplary, it being possible to display the screens in any area of the projected display screen SR. The features of the image data being projected may be taken into consideration, for example, by automatically detecting an area devoid of text, charts, or graphs, and displaying the screen in this area.

The projected display screen SR in the sixth embodiment is merely exemplary; the projected display screen may take any of a number of other forms. For example, shortcut icons for files to be opened subsequently could be arranged along the bottom edge of projected display screen SR so that when a shortcut is selected and opened, the corresponding file is sent from the server computer SC via network line NL.

The invention claimed is:

1. A projector capable of connection to a network, the projector comprising:
   a network connection portion for sending and receiving data over a network, the network connection portion determining whether the received data is image data or application service provider (ASP) data, the ASP data requiring execution of an application program to generate the image data;
   an internal image data generating portion for generating user interface image data for display, based on the data received via the network connection portion, by executing an application program for the ASP data when the network connection portion determines that the received data is the ASP data; and
   a projection display portion for projecting the generated user interface image data,
   the projector having a single body that includes the network connection portion, the internal image data generating portion, and the projection display portion.

2. The projector according to claim 1, the image data generating portion executing a viewer application and generating the user interface image data on the basis of the received data.

3. The projector according to claim 1, the image data generating portion identifying the data format of the received data, executing a suitable viewer application for the identified data format, and generating the user interface image data.

4. The projector according to claim 1, further comprising:
a playback audio data generating portion for generating audio data for playback on the basis of data received via the network connection portion; and
an audio data playback portion for outputting the generated playback audio data.

5. The projector according to claim 4,
the data being multimedia data including motion video data and audio data associated with motion video data,
the internal image data generating portion generating the user interface image data for display on the basis of motion video data received via the network connection portion, and
the audio data playback portion generating playback audio data associated with the generated image data on the basis of audio data associated with motion video data received via the network connection portion.

6. The projector according to claim 1, further comprising:
an external input signal receiving portion for receiving an external input signal from an external input portion.

7. The projector according to claim 6, further comprising:
an identifier for uniquely identifying itself from other projectors,
the external input portion including an identifier selecting portion for selecting the identifier, and enabling unique input to one desired projector from among a plurality of projectors.

8. The projector according to claim 6, the external input portion transmitting an input signal to the external input signal receiving portion by a wireless device.

9. The projector according to claim 6, further comprising:
a data decision portion for deciding, during projection display and/or after projection display of the image data and via the external input portion, the next set of data to be received via the network.

10. The projector according to claim 1, the projection display portion including an electro optical data output portion, a light source for illuminating the electro optical data output portion, and a lens for enlarging images projected by the light source.

11. The projector according to claim 1, further comprising:
an image data conversion portion for converting a projected image to image data; and
a storage device for storing the converted image data.

12. The projector according to claim 11, further comprising:
a date/time stamp portion for appending to the user interface image data, the conversion date/time or save date/time of the user interface image data.

13. The projector according to claim 12, further comprising:
an enhancement portion for applying enhancements to a projected image, the image data conversion portion converting the enhanced image to enhanced image data, and the date/time stamp portion appending the date/time of the enhancement or the date/time the enhanced image data being saved.

14. The projector according to claim 12, further comprising:
an image data associating portion for associating a plurality of items of the user interface image data by way of association data described in markup language (ML) format.

15. The projector according to claim 14, the image data associating portion chronologically associating a plurality of items of the user interface image data using either the conversion date/time or save date/time of the user interface image data.

16. The projector according to claim 15, the projection display portion reading and projecting the saved user interface image data.

17. The projector according to claim 13, further comprising:
an image data associating portion for associating a plurality of items of the user interface image data and the enhanced image data by way of association data described in markup language (ML) format.

18. The projector according to claim 17, the image data associating portion chronologically associating a plurality of items of the enhanced image data and the user interface image data, by using either the date/time of the enhancement or the save date/time of the of enhanced image data in the case of the enhanced image data, or by using the date/time of conversion or save date/time of the user interface image data in the case of the image data other than the enhanced image data.

19. The projector according to claim 18, the projection display portion reading and projecting the saved enhanced image data and/or image data.

20. The projector according to claim 13, the storage device being connected to the network, and
the enhanced image data being stored in a storage device connected to the network.

21. The projector according to claim 1, the projector functioning as a terminal device for an application service provider (ASP).

22. A display system wherein results of operations performed by a server being displayed via a plurality of projectors connected over a network, the system comprising:
a projector;
a data generating device, the data generating device being provided for each projector, to execute operations in response to a request from the projector and to generate data for displaying user interface data; and
a data transmitting device to transmit the generated data to the projector requesting the operations,
the projector including:
a transmitting/receiving device to transmit a request for the operations to the server via the network and to receive the data transmitted from the server, the transmitting/receiving device determining whether the received data is image data or application service provider (ASP) data, the ASP data requiring execution of an application program to generate the image data;
an internal image data generating device to generate the ASP user interface image data for display on the basis of the received data by executing an application program for the ASP data when transmitting/receiving device determines that the received data is the ASP data; and
a projection display device to project the generated image data,
the projector having a single body that includes the transmitting/receiving device, the internal image data generating device, and the projection display device.

23. The display system according to claim 22, the data generated by the generating device of the server having a unique format and consisting of differential data for previous data and current data, and the internal image data generating device of the projector using a client application to generate the user interface image data on the basis of the data.

24. A display system according to claim 22, the projector being a projector for an application service provider (ASP).

25. A method for displaying images via a projector connected to a network, the method comprising:

executing an application in response to a request from a client in a server connected to the network;

transmitting to the requesting client and the projector via the network user interface data resulting from execution of the application in a server connected to the network;

receiving, in the projector, the transmitted user interface data, and determining whether the received user interface data is image data or application service provider (ASP) data, the ASP data requiring execution of an application program to generate the image data;

generating, in the projector, user interface image data for display on the basis of the received user interface data by executing an application program for the ASP data when the received user interface data is the ASP data; and projecting the generated image data, the projector having a single body in which to perform the receiving, the determining, the generating and the projecting.

26. The method according to claim 25, the client being a second projector.